US008976751B2

(12) United States Patent
Yang et al.

(10) Patent No.: US 8,976,751 B2
(45) Date of Patent: Mar. 10, 2015

(54) METHOD FOR TRANSMITTING CONTROL INFORMATION AND APPARATUS FOR SAME

(75) Inventors: Suck Chel Yang, Anyang-si (KR); Min Gyu Kim, Anyang-si (KR); Joon Kui Ahn, Anyang-si (KR); Dong Youn Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 129 days.

(21) Appl. No.: 13/809,380

(22) PCT Filed: Jul. 18, 2011

(86) PCT No.: PCT/KR2011/005262
§ 371 (c)(1),
(2), (4) Date: Jan. 9, 2013

(87) PCT Pub. No.: WO2012/008815
PCT Pub. Date: Jan. 19, 2012

(65) Prior Publication Data
US 2013/0114554 A1 May 9, 2013

Related U.S. Application Data

(60) Provisional application No. 61/364,815, filed on Jul. 16, 2010.

(51) Int. Cl.
*H04W 4/00* (2009.01)
*H04W 72/04* (2009.01)
(Continued)

(52) U.S. Cl.
CPC .......... *H04W 72/0406* (2013.01); *H04W 24/10* (2013.01); *H04L 1/0027* (2013.01); *H04L 5/001* (2013.01); *H04L 5/0057* (2013.01); *H04L 1/0026* (2013.01); *H04B 7/0417* (2013.01)
USPC ............................ 370/329; 370/252; 370/254

(58) Field of Classification Search
USPC ................................... 370/252, 328, 329, 455
See application file for complete search history.

(56) References Cited

U.S. PATENT DOCUMENTS 8,050,227 B2 * 11/2011 Lee et al. ...................... 370/329
8,305,970 B2 * 11/2012 Park et al. .................... 370/329
(Continued)

FOREIGN PATENT DOCUMENTS

JP 2008-25717 A 10/2008
JP 2008-301253 A 12/2008
(Continued)

OTHER PUBLICATIONS

Interdigital Communications, LLC, "Procedures for collisions between periodic and aperiodic," 3GPP TSG RAN WG1 Meeting #53bis, R1-082523, Jun. 30-Jul. 4, 2008, pp. 1-6, XP050110788.
(Continued)

*Primary Examiner* — Brian O'Connor
(74) *Attorney, Agent, or Firm* — Birch, Stewart, Kolasch & Birch, LLP

(57) ABSTRACT

Channel state information (CSI) reporting is described. CSI configuration information for a plurality of cells, and information requesting an aperiodic CSI report for a first cell are received. A periodic CSI report for a second cell different from the first cell with the aperiodic CSI report for the first cell in a corresponding subframe is transmitted. If a physical uplink control channel (PUCCH) and a physical uplink shared channel (PUSCH) are transmitted in the corresponding subframe simultaneously, the periodic CSI report for the second cell is transmitted via the PUCCH and the aperiodic CSI report for the first cell is transmitted via the PUSCH in the corresponding subframe. Otherwise, the periodic CSI report for the second cell is piggybacked on the PUSCH and the periodic CSI report for the second cell and the aperiodic CSI report for the first cell are transmitted via the PUSCH in the corresponding subframe.

4 Claims, 15 Drawing Sheets (a) PUCCH/PUSCH simultaneous transmission mode (b) UCI piggyback transmission mode

(51) Int. Cl.
*H04W 24/10* (2009.01)
*H04L 1/00* (2006.01)
*H04L 5/00* (2006.01)
*H04B 7/04* (2006.01)

(56) References Cited

U.S. PATENT DOCUMENTS

| | | | |
|---|---|---|---|
| 8,379,588 B2* | 2/2013 | Lee et al. | 370/329 |
| 8,520,617 B2* | 8/2013 | Krishnamurthy et al. | 370/329 |
| 8,542,640 B2* | 9/2013 | Ramprashad et al. | 370/329 |
| 8,724,574 B2* | 5/2014 | Yang et al. | 370/329 |
| 2007/0211656 A1 | 9/2007 | Kwak et al. | |
| 2007/0298728 A1 | 12/2007 | Imamura et al. | |
| 2008/0259860 A1 | 10/2008 | Ohseki et al. | |
| 2010/0098012 A1 | 4/2010 | Bala et al. | |
| 2011/0249578 A1* | 10/2011 | Nayeb Nazar et al. | 370/252 |
| 2012/0008489 A1* | 1/2012 | Higuchi et al. | 370/203 |
| 2012/0127869 A1 | 5/2012 | Yin et al. | |
| 2013/0100917 A1* | 4/2013 | Seo et al. | 370/329 |
| 2013/0121299 A1* | 5/2013 | Kim et al. | 370/329 |

FOREIGN PATENT DOCUMENTS

| | | |
|---|---|---|
| KR | 10-2007-0067680 A | 6/2007 |
| KR | 10-2007-0074431 A | 7/2007 |

OTHER PUBLICATIONS

LG Electronics, "UL CC selection for UCI transmission on PUSCH," 3GPP TSG RAN WG1 Meeting #64, R1-110848, Feb. 21-25, 2011, pp. 1-3, XP050490619.

* cited by examiner

METHOD FOR TRANSMITTING CONTROL INFORMATION AND APPARATUS FOR SAME

CROSS REFERENCE TO RELATED APPLICATIONS

This non-provisional application is a National Stage entry under U.S.C. §371 of International Application No. PCT/KR2011/005262 filed on Jul. 18, 2011, which claims the benefit of U.S. Provisional Application No. 61/364,815 filed on Jul. 16, 2010. The entire contents of all of the above applications are hereby incorporated by reference

TECHNICAL FIELD

The present invention relates to a wireless communication system, and more particularly, to a method and apparatus for transmitting control information.

BACKGROUND ART

Wireless communication systems are being widely deployed to provide various types of communication services such as voice or data services. Generally, a wireless communication system is a multiple access system capable of supporting communication with multiple users by sharing available system resources (bandwidth, transmit power, etc.). The multiple access system includes, for example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and the like.

DISCLOSURE

Technical Problem

An object of the present invention is to provide a method and apparatus for efficiently transmitting control information in a wireless communication system. Another object of the present invention is to provide a method and apparatus for efficiently piggybacking control information on data. Still another object of the present invention is to provide a method and apparatus for efficiently piggybacking control information on an uplink shared channel in a carrier aggregated situation.

It will be appreciated by persons skilled in the art that that the technical objects that can be achieved through the present invention are not limited to what has been particularly described hereinabove and other technical objects of the present invention will be more clearly understood from the following detailed description.

Technical Solutions

In an aspect of the present invention, a method for performing Channel State Information (CSI) reporting in a wireless communication system includes receiving CSI configuration information for a plurality of cells, wherein the CSI configuration information is used to perform a periodic CSI report for each cell; receiving information requesting an aperiodic CSI report for a specific cell; and transmitting one or more CSI reports in a corresponding subframe, wherein, if a periodic CSI report and an aperiodic CSI report for a same cell collide in the corresponding subframe, the periodic CSI report is dropped, and if one or more periodic CSI reports and an aperiodic CSI report for different cells collide in the corresponding subframe, at least a part of the one or more periodic CSI reports are transmitted through a channel for the aperiodic CSI report.

In another aspect of the present invention, a communication device configured to perform Channel State Information (CSI) reporting in a wireless communication system includes a Radio Frequency (RF) unit; and a processor, wherein the processor is configured to receive CSI configuration information for a plurality of cells, to receive information requesting an aperiodic CSI report for a specific cell, and to transmit one or more CSI reports in a corresponding subframe, wherein the CSI configuration information is used to perform a periodic CSI report for each cell; wherein, if a periodic CSI report and an aperiodic CSI report for a same cell collide in the corresponding subframe, the periodic CSI report is dropped, and if one or more periodic CSI reports and an aperiodic CSI report for different cells collide in the corresponding subframe, at least a part of the one or more periodic CSI reports are transmitted through a channel for the aperiodic CSI report.

If a plurality of periodic CSI reports and an aperiodic CSI report for different cells collide in the corresponding subframe, only one periodic CSI report having the highest priority may be transmitted through the channel for the aperiodic CSI report and the other one or more periodic CSI reports are dropped.

The one periodic CSI report having the highest priority may be selected using a content priority, a cell priority, or a combination thereof.

An indicator of the aperiodic CSI report may be received through a Physical Downlink Control Channel (PDCCH) for Physical Uplink Shared Channel (PUSCH) scheduling.

The channel for the aperiodic CSI report may include a PUSCH.

Advantageous Effects

According to embodiments of the present invention, control information can be efficiently transmitted in a wireless communication system. In addition, control information can be efficiently piggybacked on data. Furthermore, control information can be efficiently piggybacked on an uplink shared channel in a carrier aggregated situation.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

BEST MODE FOR CARRYING OUT THE INVENTION

The following technology may be used in various wireless access systems, such as CDMA, FDMA, TDMA, OFDMA and SC-FDMA systems. CDMA may be implemented with wireless technology such as Universal Terrestrial Radio Access (UTRA) or CDMA2000. TDMA may be implemented with wireless technology such as Global System for Mobile communications (GSM)/General Packet Radio Service (GPRS)/Enhanced Data Rates for GSM Evolution (EDGE). OFDMA may be implemented with wireless technology such as IEEE 802.11 (Wi-Fi), IEEE 802.16 (WiMAX), IEEE 802.20, and Evolved UTRA (E-UTRA). UTRA is part of a Universal Mobile Telecommunications System (UMTS). 3rd Generation Partnership Project (3GPP) Long Term Evolution (LTE) is a part of an Evolved UMTS (E-UMTS), which uses E-UTRA. LTE-Advanced (LTE-A) is an evolved version of 3GPP LTE.

The following embodiments of the present invention mainly describe 3GPP LTE/LTE-A in order to clarify the description. However, technical spirits of the present invention are not limited to the embodiments of the present invention described herein. Specific terms disclosed in the following description are provided to aid in understanding the present invention, and the use of these specific terms may be changed to another format within the technical scope or spirit of the present invention.

Figure 1:
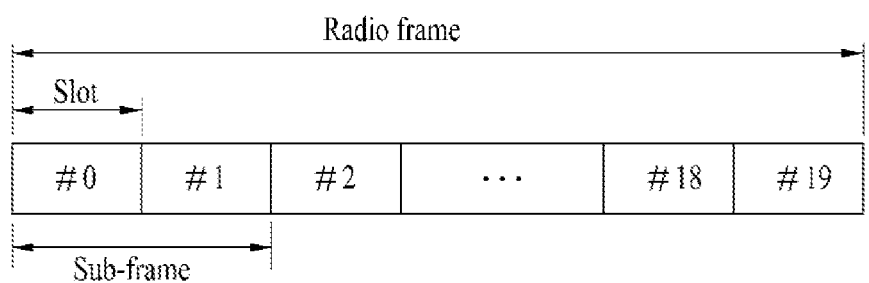
FIG. 1 illustrates the structure of a radio frame.

FIG. 1 illustrates the structure of a radio frame.

Referring to FIG. 1, the radio frame includes 10 subframes, and one subframe includes two slots in the time domain. A time required to transmit one subframe is defined as a Transmission Time Interval (TTI). For example, one subframe may have a length of 1 ms and one slot may have a length of 0.5 ms. One slot may include a plurality of OFDM symbols or Single Carrier Frequency Division Multiple Access(SC-FDMA) symbols in the time domain. Since an LTE system uses OFDMA in downlink(DL) and SC-FDMA in uplink (UL), the OFDM or SC-FDMA symbol indicates one symbol duration. A Resource Block (RB) is a resource allocation unit and includes a plurality of contiguous subcarriers in one slot. The structure of the radio frame is only exemplary. The number of subframes included in a radio frame, the number of slots included in a subframe, or the number of symbols included in a slot may be changed in various manners.

Figure 2:
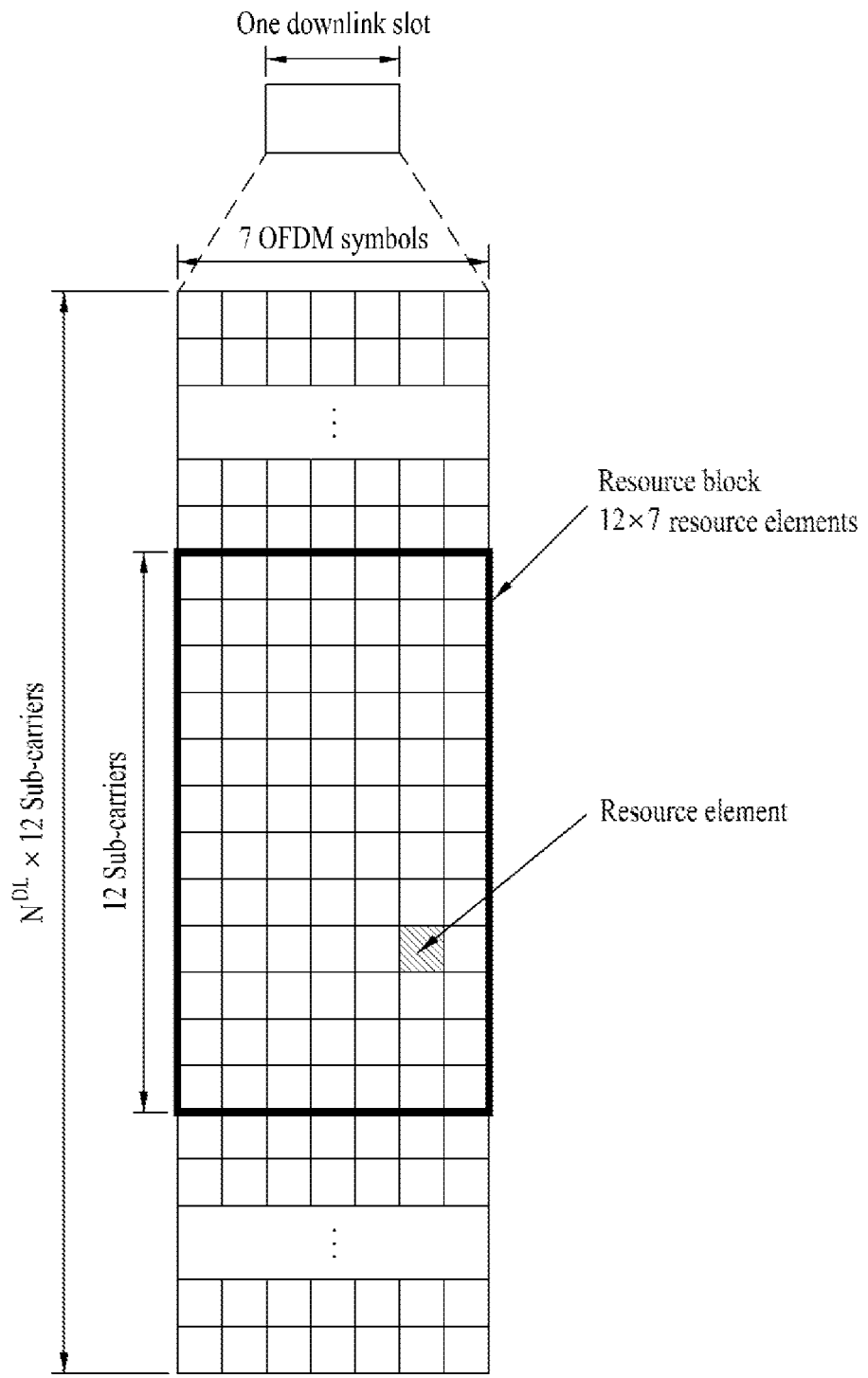
FIG. 2 illustrates a resource grid of a downlink slot.

FIG. 2 illustrates a resource grid of a DL slot.

Referring to FIG. 2, the DL slot includes a plurality of OFDM symbols in the time domain. One DL slot includes 7 (or 6) OFDM symbols and an RB may include 12 subcarriers in the frequency domain. Each element on the resource grid is referred to as a Resource Element (RE). One RB includes 12×7(or 6)REs. The number of RBs, $N_{RB}$, included in the DL slot depends on a DL transmission band. The structure of a UL slot is the same as the structure of the DL slot except that OFDM symbols are replaced with SC-FDMA symbols.

Figure 3:
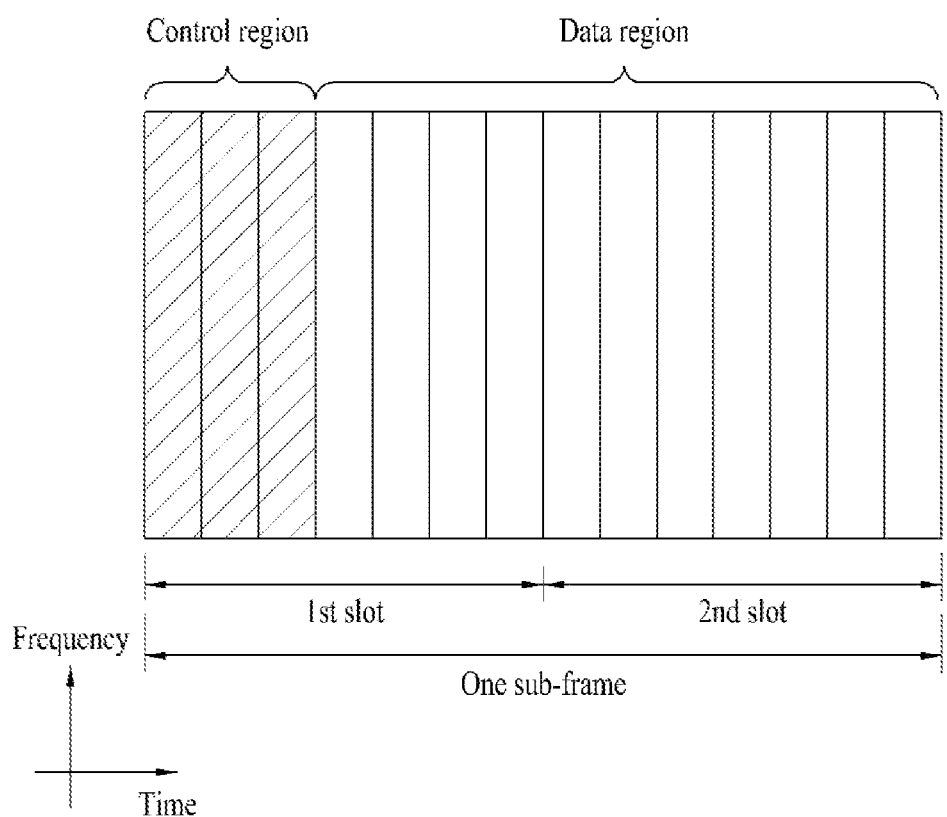
FIG. 3 illustrates the structure of a downlink subframe.

FIG. 3 illustrates the structure of a DL subframe.

Referring to FIG. 3, a maximum of 3 (or 4) OFDM symbols at the front part of a first slot of a subframe corresponds to a control region to which control channels are allocated. The remaining OFDM symbols correspond to a data region to which a Physical Downlink Shared Channel (PDSCH) is allocated. Examples of DL control channels used in the LTE system include, for example, a Physical Control Format Indicator Channel (PCFICH), a Physical Downlink Control Channel (PDCCH), a Physical Hybrid automatic repeat request Indicator Channel (PHICH), etc. The PCFICH is transmitted in the first OFDM symbol of a subframe and carries information about the number of OFDM symbols used for transmission of control channels in the subframe. The PHICH carries a Hybrid Automatic Repeat request (HARQ) Acknowledgment/Negative-Acknowledgment (ACK/NACK) signal as a response to UL transmission.

Control information transmitted through the PDCCH is referred to as Downlink Control Information (DCI). The DCI includes resource allocation information for a User Equipment (UE) or a UE group and other control information. For example, the DCI includes UL/DL scheduling information, a UL transmit (Tx) power control command, etc.

The PDCCH carries a transmission format and resource allocation information for a Downlink Shared Channel (DL-SCH), a transmission format and resource allocation information for an Uplink Shared Channel (UL-SCH), paging information on a Paging Channel (PCH), system information on the DL-SCH, resource allocation information of a higher-layer control message such as a random access response transmitted on the PDSCH, a Tx power control command set for individual UEs in a UE group, a Tx power control command, activation indication information of Voice over IP (VoIP), and the like. A plurality of PDCCHs may be transmitted in the control region. A UE may monitor a plurality of PDCCHs. The PDCCH is transmitted on an aggregate of one or plural contiguous Control Channel Elements (CCEs). A CCE is a logical allocation unit used to provide the PDCCH with a coding rate based on a radio channel state. The CCE corresponds to a plurality of Resource Element Groups (REGs). A format of the PDCCH and the number of bits of the PDCCH are determined according to the number of CCEs. A Base Station (BS) determines a PDCCH format according to DCI to be transmitted to a UE and attaches a Cyclic Redundancy Check (CRC) to control information. An identifier (e.g. Radio Network Temporary Identifier (RNTI)) is masked to the CRC according to the owner or purposes of the PDCCH. For example, if the PDCCH is dedicated to a specific UE, an identifier of the UE (e.g. cell-RNTI (C-RNTI)) may be masked to the CRC. If the PDCCH is dedicated to a paging message, a paging identifier (e.g. paging-RNTI (P-RNTI)) may be masked to the CRC. If the PDCCH is for system information (more specifically, a System Information Block (SIB)), a System Information RNTI (SI-RNTI) may be masked to the CRC. If the PDCCH is for a random access response, a Random Access RNTI (RA-RNTI) may be masked to the CRC.

Figure 4:
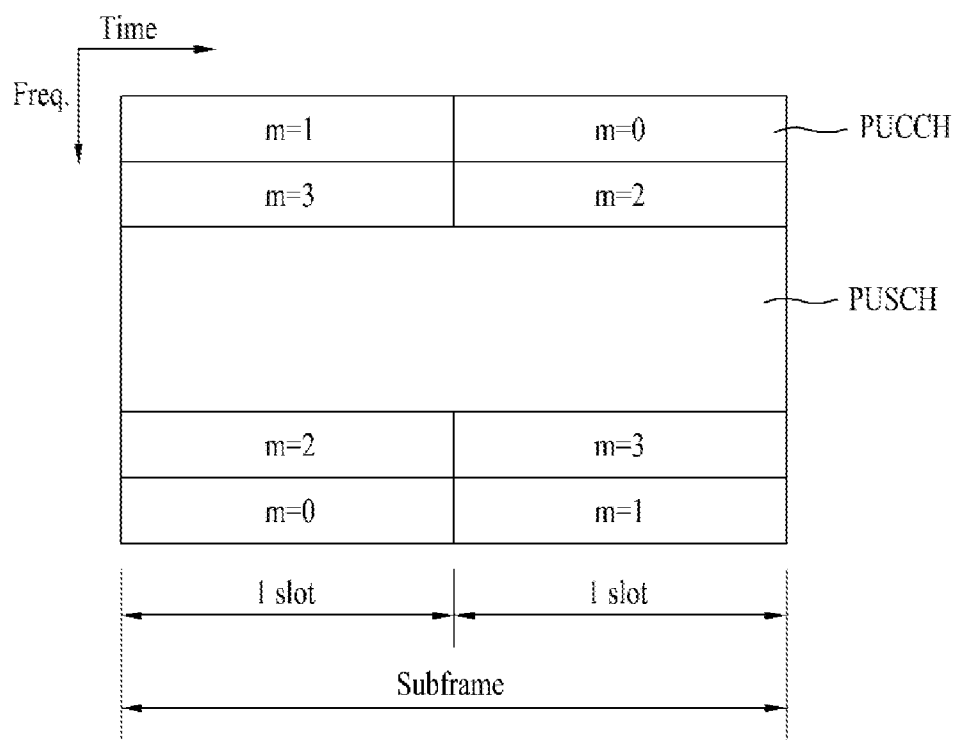
FIG. 4 illustrates the structure of an uplink subframe.

FIG. 4 illustrates the structure of a UL subframe used in an LTE system.

Referring to FIG. 4, a UL subframe includes plural (e.g. two) slots. Each slot may include a different number of SC-FDMA symbols according to the length of a Cyclic Prefix (CP). The UL subframe is divided into a data region and a control region in the frequency domain. The data region includes a PUSCH and is used to transmit data signals such as voice signals. The control region includes a PUCCH and is used to transmit Uplink Control Information (UCI). The PUCCH includes an RB pair located at both ends of the data region in the frequency domain and is hopped using the slot as a boundary.

The PUCCH may be used to transmit the following control information.

Scheduling Request (SR): used for requesting UL-SCH resources and transmitted using an On-Off Keying (OOK) scheme.

HARQ ACK/NACK: a response signal to a DL data packet on a PDSCH and indicates whether or not a DL data packet has been successfully received. 1-bit ACK/NACK is transmitted as a response to a single DL codeword, and 2-bit ACK/NACK is transmitted as a response to two DL codewords.

Channel Quality Indicator (CQI): feedback information for a DL channel. Multiple Input Multiple Output (MIMO)-associated feedback information includes a Rank Indicator (RI), a Precoding Matrix Indicator (PMI), a Precoding Type Indicator (PTI), etc. 20 bits are used per subframe.

The amount of UCI that can be transmitted in a subframe by a UE is dependent upon the number of SC-FDMA symbols available for UCI transmission. The SC-FDMA symbols available for UCI transmission indicate the remaining SC-FDMA symbols other than SC-FDMA symbols that are used for reference signal transmission in a subframe. In the case of a subframe in which a Sounding Reference Signal (SRS) is configured, the last SC-FDMA symbol of the subframe is also excluded. The reference signal is used for coherent detection of a PUCCH. The PUCCH supports 7 formats according to transmission information.

Table 1 shows the mapping relationship between PUCCH and UCI for use in LTE.

TABLE 1

| PUCCH Format | Uplink Control Information (UCI) |
| --- | --- |
| Format 1 | SR(Scheduling Request) (unmodulated waveform) |
| Format 1a | 1-bit HARQ ACK/NACK (with/without SR) |
| Format 1b | 2-bit HARQ ACK/NACK (with/without SR) |
| Format 2 | CQI (20 coded bits) |
| Format 2 | CQI and 1- or 2-bit HARQ ACK/NACK (20 bits) (for extended CP only) |
| Format 2a | CQI and 1-bit HARQ ACK/NACK (20 + 1 coded bits) |
| Format 2b | CQI and 2-bit HARQ ACK/NACK (20 + 2 coded bits) |

Figure 5:
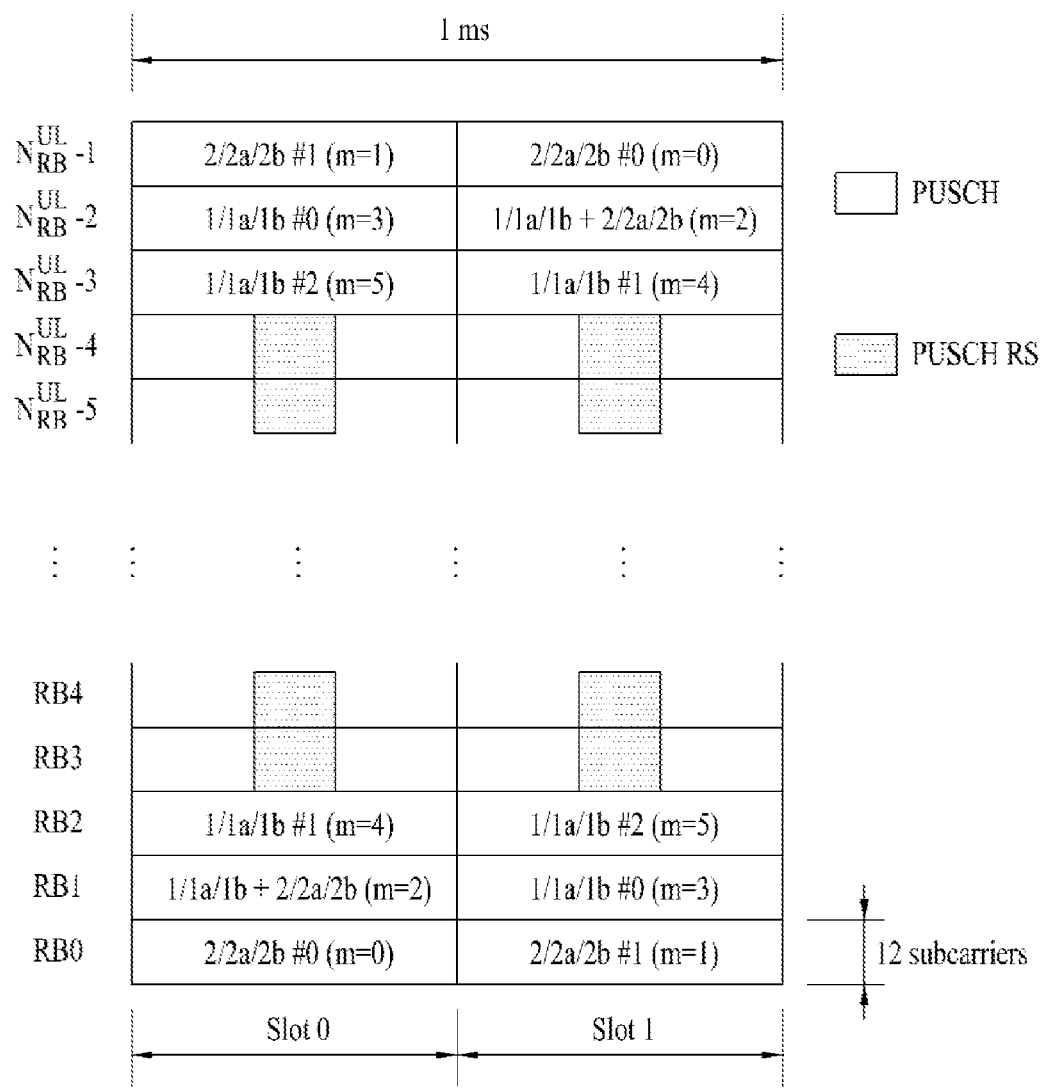
FIG. 5 illustrates physical mapping of PUCCH formats to PUCCH regions.

FIG. 5 illustrates physical mapping of PUCCH formats to PUCCH regions.

Referring to FIG. 5, PUCCH formats are mapped beginning from band edges on RBs in order of PUCCH format 2/2a/2b (CQI) (e.g. PUCCH region m=0, 1), a mixed format of PUCCH format 2/2a/2b (CQI) and PUCCH format 1/1a/1b (SR/HARQ ACK/NACK) (e.g. if present, PUCCH region m=2), and PUCCH format 1/1a/1b (SR/HARQ ACK/NACK) (e.g. PUCCH region m=3, 4, 5) and then are transmitted. The number of PUCCH RBs available for use by PUCCH format 2/2a/2b (CQI), $N_{RB}^{(2)}$, is transmitted to the UEs in the cell through broadcast signaling.

Figure 6:
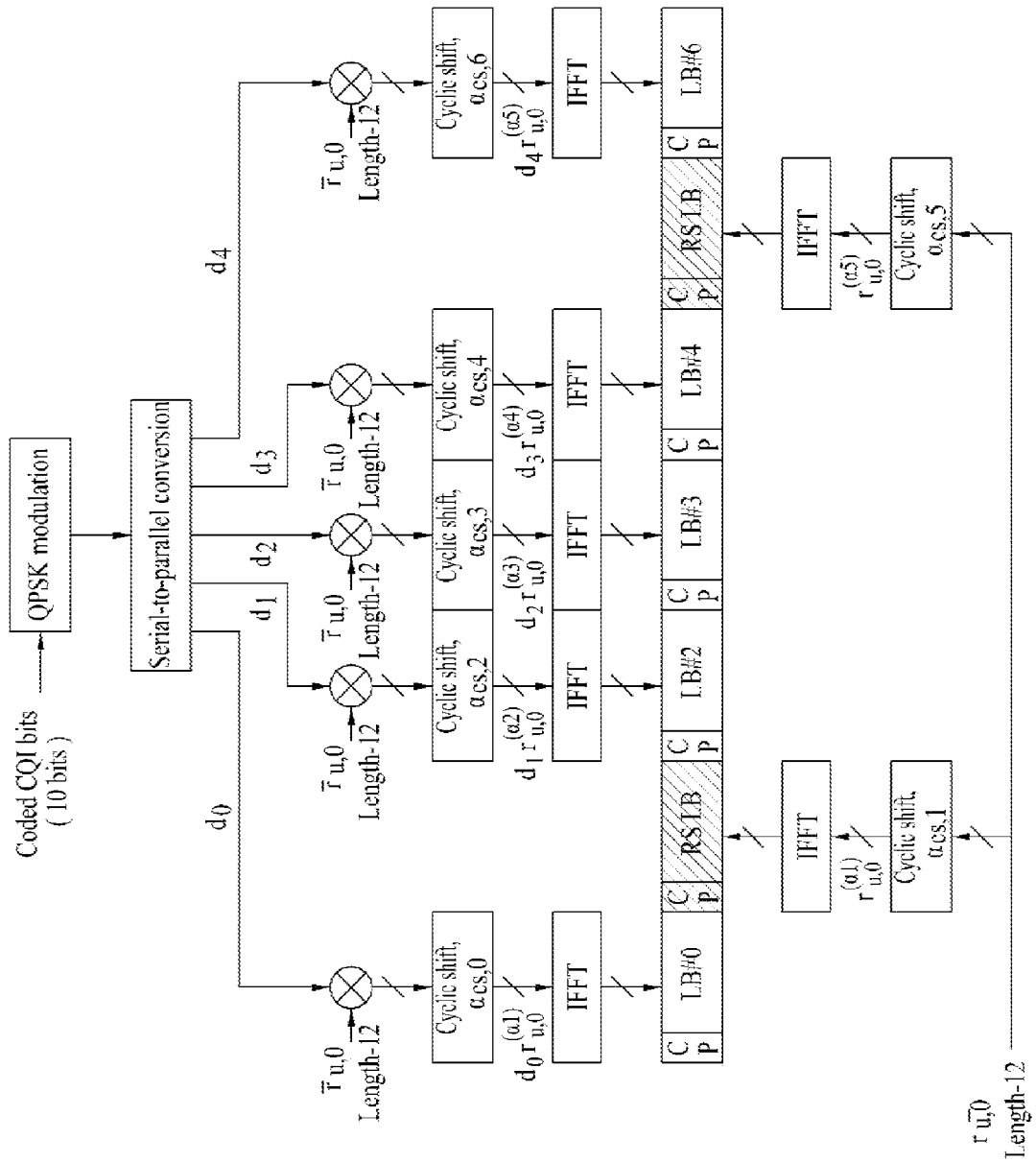
FIG. 6 illustrates a slot level structure of PUCCH format 2/2a/2b.

FIG. 6 illustrates a slot level structure of PUCCH format 2/2a/2b. PUCCH format 2/2a/2b is used for Channel State Information (CSI) transmission. The CSI includes CQI, PMI, RI, PTI, etc. SC-FDMA symbols #1 and #5 are used for Demodulation Reference Signal (DM RS) transmission in a slot in the case of normal CP. In the case of extended CP, only SC-FDMA symbol #3 is used for DM RS transmission in the slot.

Referring to FIG. 6, 10 CSI bits are channel coded with a rate ½ punctured (20, k) Reed-Muller code in a subframe level to give 20 coded bits (not shown), which are then scrambled (not shown) and undergo Quadrature Phase Shift Keying (QPSK) constellation mapping (QPSK modulation). The coded bits may be scrambled in a similar way to PUSCH data with a length-31 Gold sequence. 10 QPSK modulated symbols are generated and 5 QPSK modulated symbols d0 to d4 are transmitted in each slot through corresponding SC-FDMA symbols. Each QPSK modulated symbol is used to modulate a base RS sequence ($r_{u,0}$) of length-12 prior to Inverse Fast Fourier Transform (IFFT). Consequently, the RS sequences are cyclic shifted ($d_x * r_{u,0}^{(\alpha x)}$, x=0 to 4) according to QPSK modulated symbol values in the time domain. The RS sequences multiplied by the QPSK modulated symbol values are cyclic shifted ($\alpha_{cs}$,x, x=1, 5). When the number of cyclic shifts is N, N UEs can be multiplexed on the same CSI PUCCH RB. The DM RS sequence is similar to a CSI sequence in the frequency domain but is not modulated by a CSI modulation symbol.

Parameters/resources for periodic CSI reporting are semi-statically configured by higher layer signaling. For example, if PUCCH resource index $n_{PUCCH}^{(2)}$ is set for CSI transmission, the CSI is periodically transmitted on the CSI PUCCH linked to the PUCCH resource index $n_{PUCCH}^{(2)}$. The PUCCH resource index $n_{PUCCH}^{(2)}$ indicates a PUCCH RB and a cyclic shift $\alpha_{cs}$.

Figure 7:
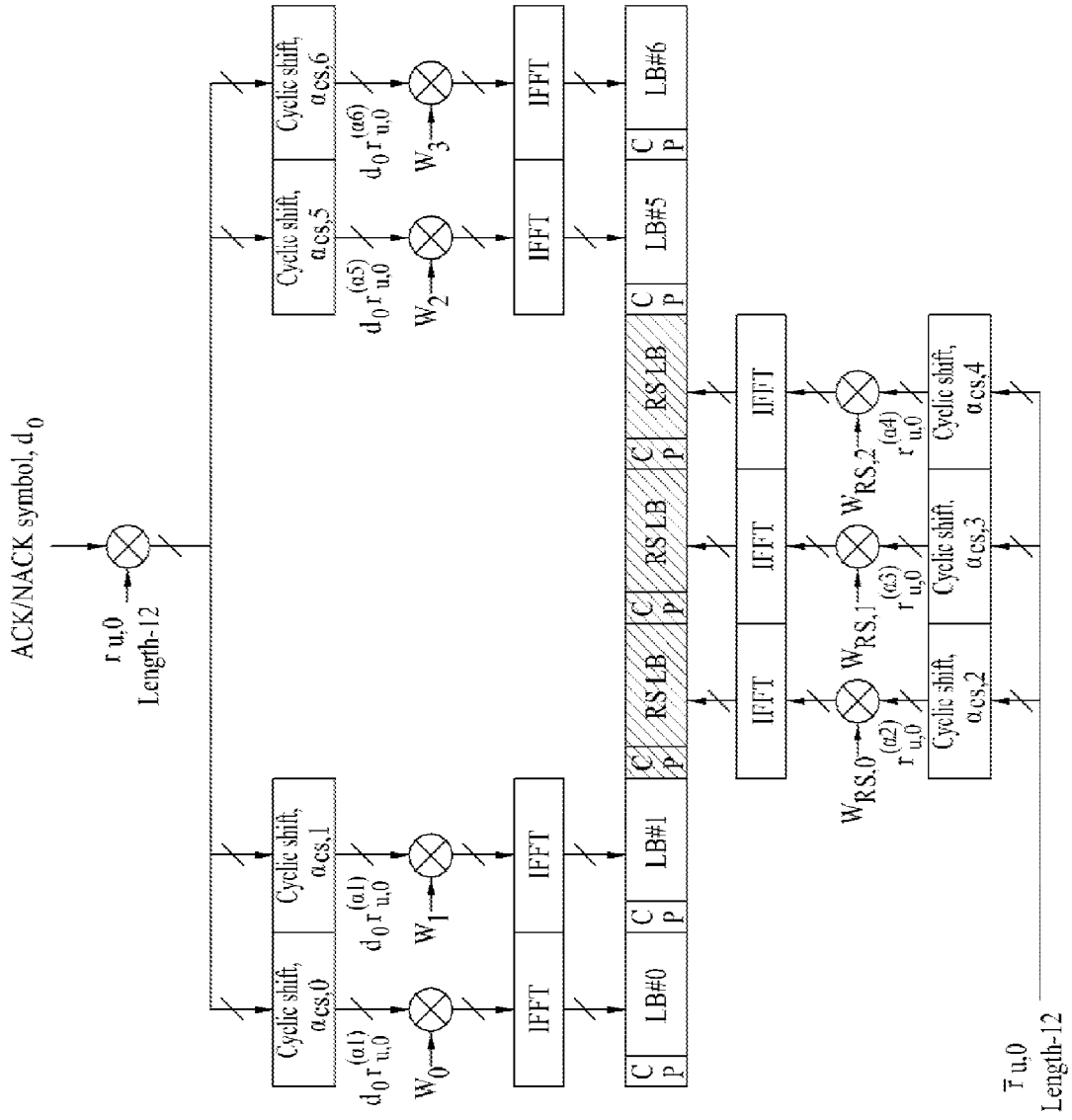
FIG. 7 illustrates a slot level structure of PUCCH format 1a/1b.

FIG. 7 illustrates a slot level structure of PUCCH format 1a/1b. PUCCH format 1a/1b is used for ACK/NACK transmission. SC-FDMA symbols #2, #3, and #4 are used for DM RS transmission in the case of normal CP. In the case of extended CP, SC-FDMA symbols #2 and #3 are used for DM RS transmission. Accordingly, four SC-FDMA symbols are used for ACK/NACK transmission in one slot.

Referring to FIG. 7, 1-bit ACK/NACK information and 2-bit ACK/NACK information are modulated using BPSK and QPSK modulation schemes, respectively, resulting in a single ACK/NACK modulation symbol $d_0$. ACK/NACK information is given as 1 for a positive ACK and as 0 for a negative ACK (HACK). In addition to the cyclic shift $\alpha_{cs,x}$ in the frequency domain as in the CQI case above, PUCCH format 1a/1b performs time domain spreading using orthogonal spreading codes (e.g. Walsh-Hadamard or DFT codes) w0, w1, w2 and w3. Since code multiplexing is used in both the frequency and time domains in the case of PUCCH format 1a/1b, a large number of UEs can be multiplexed on the same PUCCH RB.

RSs transmitted from different UEs are multiplexed in the same way as UCI. The number of cyclic shifts supported in an SC-FDMA symbol for PUCCH ACK/NACK RBs may be configured by a cell-specific higher layer signaling parameter $\Delta_{shift}^{PUCCH}$. $\Delta_{shift}^{PUCCH} \in \{1, 2, 3\}$ indicates 12, 6, and 4 shifts, respectively. In time-domain CDM, the number of spreading codes for ACK/NACK is limited by the number of RS symbols, because the multiplexing capacity of RS symbols is smaller than that of UCI symbols due to a smaller number of RS symbols.

Figure 8:
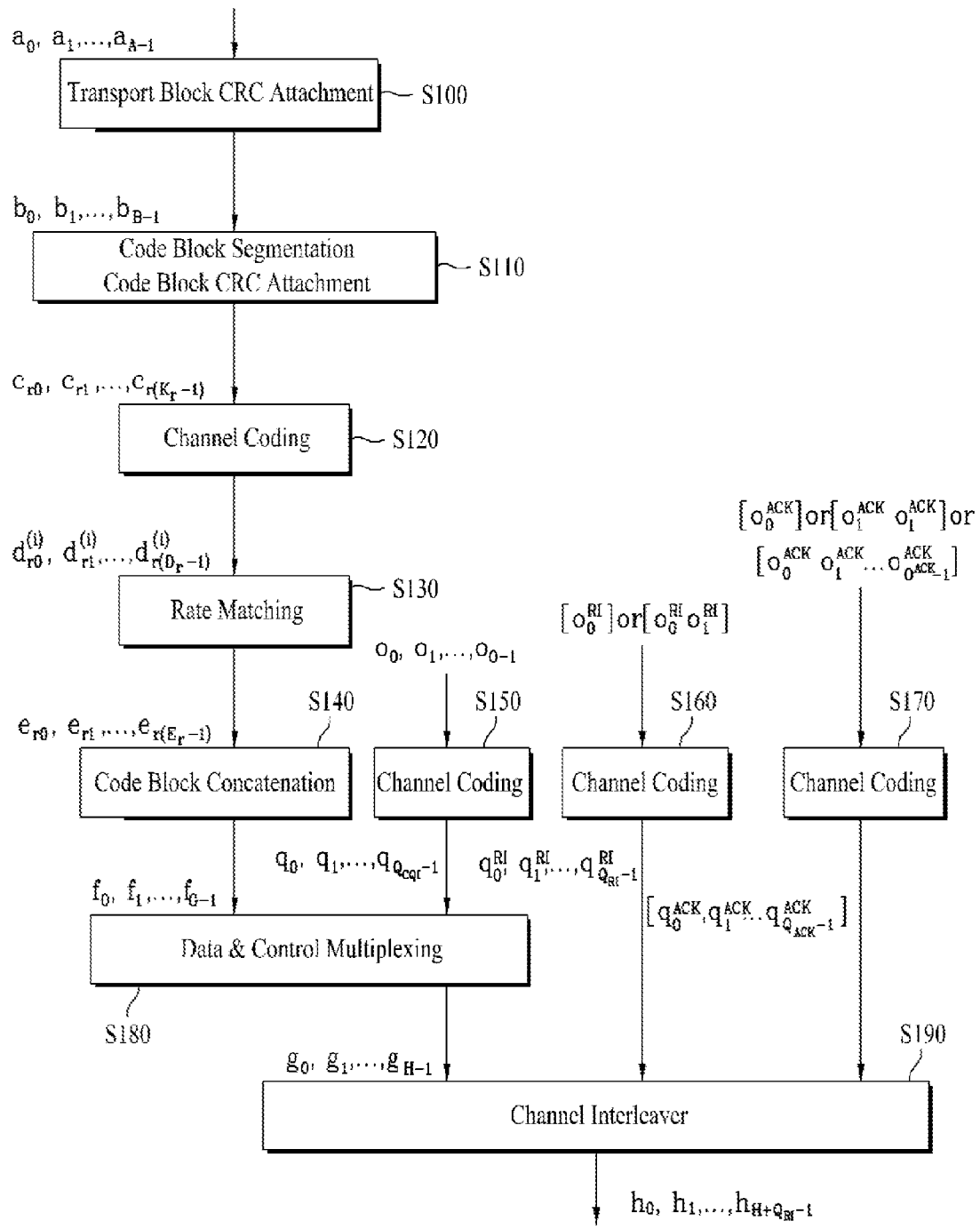
FIG. 8 illustrates a processing procedure of UL-SCH data and control information.

FIG. 8 illustrates a processing procedure of UL-SCH data and control information.

Referring to FIG. 8, error detection is provided from UL-SCH transport blocks through a CRC in step S100.

All the transport blocks are used to calculate CRC parity bits. Bits in a transport block delivered to a first layer are denoted by $a_0, a_1, a_2, a_3, \ldots, a_{A-1}$. Parity bits are denoted by $p_0, p_1, p_2, p_3, \ldots, p_{L-1}$. The size of the transport block is A and the number of parity bits is L.

Code block segmentation and code block CRC attachment are performed after transport block CRC attachment in step S110. If the number of bits of a transport block (including CRC) is B, bits input for code block segmentation are denoted by $b_0, b_1, b_2, b_3, \ldots, b_{B-1}$. If the number of coded blocks is r and the number of bits for the number r of coded blocks is Kr, then bits provided after code block segmentation are denoted by $c_{r0}, c_{r1}, c_{r2}, c_{r3}, \ldots, c_{r(K_r-1)}$.

Channel coding is performed after code block segmentation and code block CRC attachment in step S120. If an i-th coded stream for the number r of coded blocks is $D_r$, i.e. $D_r = K_r + 4$, bits after channel coding are denoted by $d_{r0}^{(i)}, d_{r1}^{(i)}, d_{r2}^{(i)}, d_{r3}^{(i)}, \ldots, d_{r(D_r-1)}^{(i)}$.

Rate matching is performed in a turbo coded block after the channel coding in step S130. If the number of coded blocks is r and the number of rate-matched bits for the number r of coded blocks is $E_r$, bits after rate matching are given by $e_{r0}, e_{r1}, e_{r2}, e_{r3}, \ldots, e_{r(E_r-1)}$.

Code block concatenation is performed after rate matching in step S140. When control information is multiplexed with UL-SCH transmission, if the total number of coded bits for transmission for excluding bits used for control transmission is G, bits after code block concatenation are denoted by $f_0, f_1, f_2, f_3, \ldots, f_{G-1}$.

Channel coding of CQI is performed using an input sequence $o_0, o_1, o_2, \ldots, o_{O-1}$ in step S150. An output sequence of channel coding of CQI is denoted by $q_0, q_1, q_2, q_3, \ldots, q_{Q_{CQI}-1}$.

Channel coding of RI is performed using an input sequence $[o_0^{RI}]$ or $[o_0^{RI} o_1^{RI}]$ in step S160. $[o_0^{RI}]$ and $[o_0^{RI} o_1^{RI}]$ indicate 1-bit RI and 2-bit RI, respectively.

Channel coding of a HARQ-ACK is performed using an input sequence $[o_0^{ACK}]$, $[o_0^{ACK} o_1^{ACK}]$, or $[o_0^{ACK} o_1^{ACK} \ldots o_{O^{ACK}-1}^{ACK}]$ in step S170. ACK is encoded to '1' of a binary number and NACK is encoded to '0' of a binary number. HARQ-ACK may be comprised of 1-bit information (i.e. $[o_0^{ACK}]$) or 2-bit information (i.e. $o_0^{ACK}$) together with an ACK/NACK bit $o_0^{ACK}$ for codeword 0 and an ACK/NACK bit $o_1^{ACK}$ for codeword 1.

1-bit or 2-bit ACK/NACK or RI is modulated such that the Euclidean distance of a modulation symbol which carries ACK/NACK or RI is maximized. More specifically, a constellation point in the outermost side of a constellation for 16/64-QAM PUSCH modulation is used for ACK/NACK or RI modulation and thus the transmit power of ACK/NACK/RI increases compared to the average power of PUSCH data. Repetition coding is used for 1-bit ACK/NACK or RI. In the case of 2-bit ACK/NACK or RI, a (3,2) simplex code is used and encoded data may be cyclically repeated.

Table 2 shows an example of channel coding of 1-bit HARQ-ACK and Table 3 shows an example of channel coding of 2-bit HARQ-ACK/NACK.

TABLE 2

| $Q_m$ | Encoded HARQ-ACK |
|---|---|
| 2 | $[o_0^{ACK} y]$ |
| 4 | $[o_0^{ACK} y x x]$ |
| 6 | $[o_0^{ACK} y x x x x]$ |

TABLE 3

| $Q_m$ | Encoded HARQ-ACK |
|---|---|
| 2 | $[o_0^{ACK} o_1^{ACK} o_2^{ACK} o_0^{ACK} o_1^{ACK} o_2^{ACK}]$ |
| 4 | $[o_0^{ACK} o_1^{ACK} x x o_2^{ACK} o_0^{ACK} x x o_1^{ACK} o_2^{ACK} x x]$ |
| 6 | $[o_0^{ACK} o_1^{ACK} x x x x o_2^{ACK} o_0^{ACK} x x x x o_1^{ACK} o_2^{ACK} x x x x]$ |

Here, Qm denotes modulation order. For example, Qm=2, 4, and 6 may correspond to QPSK, 16QAM, and 64 QAM, respectively. $o_0^{ACK}$ represents an ACK/NACK bit for codeword 0 and $o_1^{ACK}$ represents an ACK/NACK bit for codeword 1. $o_2^{ACK} = (o_0^{ACK} + o_1^{ACK})$ mod 2 and 'mod' denotes a modulo operation. x or y denotes a place holder for maximizing the Euclidean distance of a modulation symbol carrying HARQ-ACK/NACK information when an HARQ-ACK bit is scrambled. Each of x and y has a value of 0 or 1.

HARQ-ACK may be comprised of information of two bits or more. That is, if $O^{ACK} > 2$, then the HARQ-ACK is $[o_0^{ACK} o_1^{ACK} \ldots o_{O^{ACK}-1}^{ACK}]$. If the total number of coded bits for encoded HARQ-ACK blocks is $Q_{ACK}$, a bit sequence $q_0^{ACK}, q_1^{ACK}, q_2^{ACK}, \ldots, q_{Q^{ACK}-1}^{ACK}$ is obtained through a combination of a plurality of encoded HARQ-ACKs.

Coded bits of UL-SCH denoted by $f_0, f_1, f_2, f_3, \ldots, f_{G-1}$ and coded bits of control information denoted by $q_0, q_1, q_2, q_3, \ldots, q_{Q_{CQI}-1}$ are input to a data/control multiplexing block in step S180.

If H=(G+$Q_{CQI}$), H'=H/$Q_m$, and $g_i$ (where i=0, ..., H'-1) is a column vector of length $Q_m$, then an output of the data/control multiplexing block is given by $g_0, g_1, g_2, g_3, \ldots, g_{H'-1}$. H is the total number of coded bits allocated for UL-SCH data and CQI/PMI information.

Channel interleaving of step S190 is performed with respect to the output of the data/control multiplexing block, $g_0, g_1, g_2, \ldots, g_{H'-1}$, the coded RI $q_0^{RI}, q_1^{RI}, q_2^{RI}, \ldots, q_{Q'_{RI}-1}^{RI}$, and the coded HARG-ACK $q_0^{ACK}, q_1^{ACK}, q_2^{ACK}, \ldots, qq_{Q'_{ACK}-1}^{ACK}$. $g_i$ (where i=0, ..., H'-1) is a column vector of length $Q_m$ and H'=H/$Q_m$. $q_i^{ACK}$ (where i=0, ..., $Q'_{ACK}$-1) is a column vector of length $Q_m$ and $Q'_{ACK} = Q_{ACK}/Q_m$. $q_i^{RI}$ (where i=0, ..., $Q'_{RI}$-1) is a column vector of length $Q_m$ and $Q'_{RI} = Q_{RI}/Q_m$.

Channel interleaving multiplexes control information and UL-SCH data on a PUSCH resource. More specifically, channel interleaving includes a process of mapping control information and UL-SCH data to a channel interleaver matrix corresponding to the PUSCH resource.

After channel interleaving, a bit sequence $h_0, h_1, h_2, \ldots, h_{H+Q_{RI}-1}$ read from the channel interleaver matrix row by row is generated. The number of modulation symbols of a subframe is H''=H'+$Q'_{RI}$.

Figure 9:
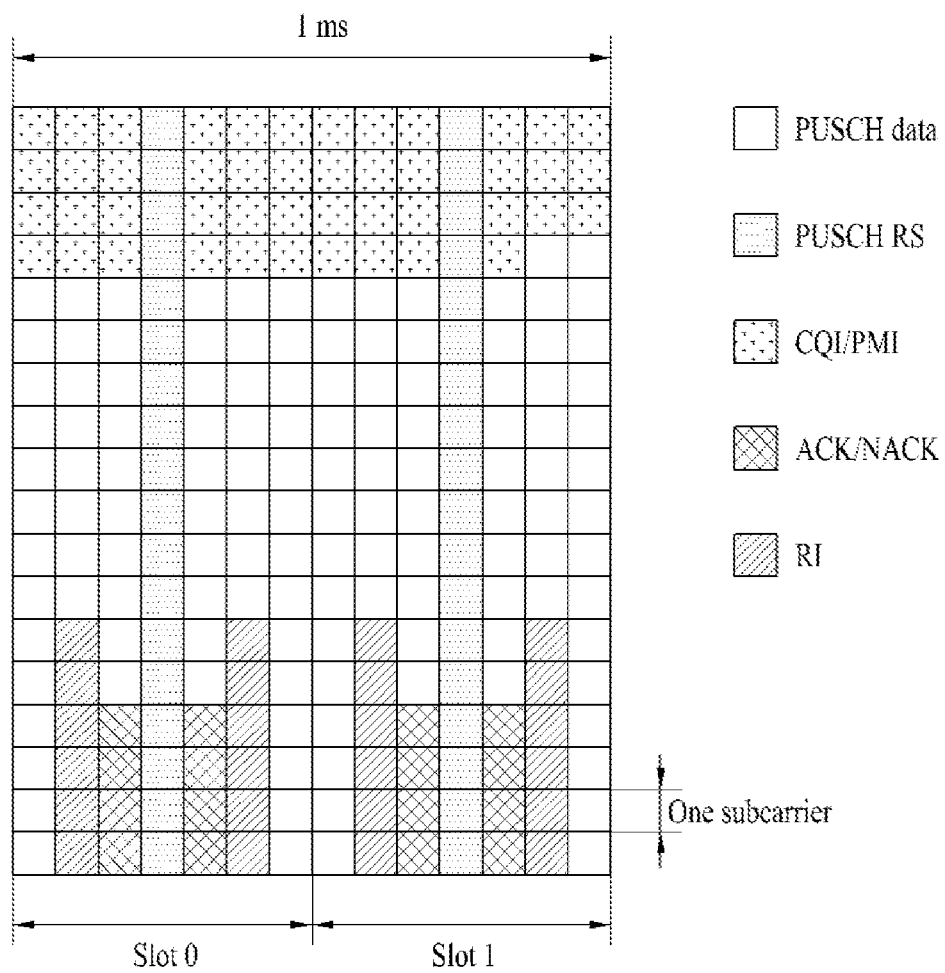
FIG. 9 illustrates multiplexing of control information and UL-SCH data on a PUSCH.

FIG. 9 illustrates multiplexing of control information and UL-SCH data on a PUSCH. If it is desired to transmit control information in a subframe to which PUSCH transmission is allocated, a UE multiplexes control information (UCI) and UL-SCH data prior to DFT spreading. The control information includes at least one of CSI and HARQ ACK/NACK. The CSI includes at least one of CQI/PMI and RI. The numbers of REs used for CQI/PMI, ACK/NACK, and RI transmission are based on a Modulation and Coding Scheme (MCS) assigned for PUSCH transmission and an offset value ($\Delta_{offset}^{CQI}$, $\Delta_{offset}^{HARQ-ACK}$, or $\Delta_{offset}^{RI}$). The offset value permits different coding rates according to control information and is semi-statically configured by higher-layer (e.g. RRC) signaling. UL-SCH data and control information are not mapped to the same RE. The control information is mapped to be all present in two slots of a subframe. Since a BS can pre-recognize that control information is to be transmitted through a PUSCH, the BS may easily demultiplex the control information and data packets.

Referring to FIG. 9, CQI and/or PMI (CQI/PMI) resources are located at the beginning part of UL-SCH data resources. The CQI/PMI resources are sequentially mapped to all SC-FDMA symbols on one subcarrier and then are mapped to symbols on the next subcarrier (time-first mapping). The CQI/PMI resources are mapped starting from left to right within each subcarrier, namely, in the direction of ascending an SC-FDMA symbol index. PUSCH data (UL-SCH data) is rate-matched in consideration of CQI/PMI. A modulation order which is the same as the modulation order of the UL-SCH data is used for CQI/PMI. If CQI/PMI information size (payload size) is small (e.g. 11 bits or less), the CQI/PMI information may use a (32, k) block code in a similar way to PUCCH transmission and encoded data may be cyclically repeated. A CRC is not used when the CQI/PMI information size is small. If the CQI/PMI information size is large (e.g. 11 bits or more), an 8-bit CRC is attached and channel coding and rate matching are performed using a tail-biting convolutional code. ACK/NACK is inserted through puncturing into part of SC-FDMA resources to which the UL-SCH data is mapped. ACK/NACK is located next to an RS and is filled from the bottom to top of an SC-FDMA symbol, i.e. in the direction of ascending a subcarrier index. In a normal CP, SC-FDMA symbols for ACK/NACK are located at SC-FDMA symbols #2/#5 of each slot as shown. Irrespective of whether ACK/NACK is actually transmitted in a subframe, a coded RI symbol is located next to the symbol for ACK/NACK. RI and CQI/PMI are independently coded and the UL-SCH data is rate-matched in consideration of RI in a similar manner to the case of CQI/PMI.

In LTE, control information (e.g. QPSK modulated) may be scheduled to be transmitted on a PUSCH without UL-SCH data. Control information (CQI/PMI, RI and/or ACK/NACK) is multiplexed before DFT-spreading in order to maintain low Cubic Metric (CM) and single-carrier properties. Multiplexing of ACK/NACK, RI, and CQI/PMI is similar to multiplexing illustrated in FIG. 9. An SC-FDMA symbol for ACK/NACK is located next to an RS and CQI-mapped resources may be punctured. The numbers of REs for ACK/NACK and RI are based on a reference MCS (CQI/PMI MCS) and an offset parameter ($\Delta_{offset}^{CQI}$, $\Delta_{offset}^{HARQ-ACK}$, or $\Delta_{offset}^{RI}$). The reference MCS is calculated from a CQI payload size and resource allocation. Channel coding and rate matching for control signaling without UL-SCH data is identical to channel coding and rate matching for control signaling with the UL-SCH.

Next, CSI reporting is described. CSI includes CQI, PMI, RI, or a combination thereof. For convenience, CQI is used as a representative example of CSI in part of the following description. However, this is for convenience of description and, in the present specification, CSI and CQI are interchangeably used.

The periodicity and frequency resolution to be used by a UE to report CSI are controlled by a BS. In the time domain, periodic and aperiodic CSI reporting is supported. A PUCCH is used for periodic CSI reporting and a PUSCH is used for aperiodic CSI reporting. In the case of aperiodic CSI, the BS instructs the UE to transmit an individual CSI report through a PDCCH for PUSCH scheduling and individual CSI is fed back to the BS through a PUSCH. The frequency granularity of CSI reporting is defined by the number N of subbands, each comprised of k contiguous RBs. The value of k depends on the type of CSI report. The number of subbands is given by $N=\lceil N_{RB}^{DL}/k \rceil$, where $N_{RB}^{DL}$ is the number of RBs in a system bandwidth. A CSI reporting mode includes wideband CQI, BS-configured subband feedback, or UE-selected subband feedback.

First, aperiodic CSI reporting is described in detail. Aperiodic CSI reporting on the PUSCH is scheduled by the BS by setting a CSI request bit in a UL grant on the PDCCH to a specific value. The type of CSI report is configured by the BS by RRC signaling. The CSI reporting type includes the followings.

Wideband (WB) feedback: the UE reports one wideband CQI value for the whole system bandwidth.

BS-configured subband feedback: the UE reports one WB CQI value for the whole system bandwidth. In addition, the UE reports a CQI value for each subband, calculated assuming transmission in the relevant subband. The subband size k is given by a function of system bandwidth as summarized in Table 4.

UE-selected subband (SB) feedback: the UE selects M preferred subbands (size=k) within the whole system bandwidth where k and M are given in Table 5. The UE reports one wideband CQI value, and one wideband value reflecting the average quality of the M selected subbands.

TABLE 4

| System bandwidth (RBs) | Sub-band size (k RBs) |
|---|---|
| 6-7 | (Wideband CQI only) |
| 8-10 | 4 |
| 11-26 | 4 |
| 27-63 | 6 |
| 64-110 | 8 |

TABLE 5

| System bandwidth (RBs) | Sub-band size (k RBs) | Number of preferred sub-bands (M) |
|---|---|---|
| 6-7 | (Wideband CQI only) | (Wideband CQI only) |
| 8-10 | 2 | 1 |
| 11-26 | 2 | 3 |
| 27-63 | 3 | 5 |
| 64-110 | 4 | 6 |

Next, periodic CSI reporting is described in detail. If the BS wishes to receive periodic reporting of CSI, the UE transmits a CSI report using the PUCCH. For example, a wideband CQI and UE-selected subband feedback may be used for periodic CQI reporting. Similarly to aperiodic CQI reporting, the type of periodic CSI reporting is configured by the BS using RRC signaling. For the wideband periodic CQI reporting, the period can be configured to {2, 5, 10, 16, 20, 32, 40, 64, 80, 160} ms or "Off" (for FDD). While the wideband feedback mode is similar to the case of aperiodic CSI reporting, the UE-selected subband CQI is different from the case of aperiodic CSI reporting. Specifically, the total number of subbands, N, is divided into J fractions called Bandwidth Parts (BPs). The value of J depends on the systemband width as shown in Table 6. In the case of periodic UE-selected subband CQI reporting, one CQI value is computed and reported for a single selected subband from each BP. The corresponding subband index is transmitted along with the CQI value.

TABLE 6

| System bandwidth (RBs) | Sub-band size (k RBs) | Number of bandwidth parts (J) |
|---|---|---|
| 6-7 | (Wideband CQI only) | 1 |
| 8-10 | 4 | 1 |
| 11-26 | 4 | 2 |
| 27-63 | 6 | 3 |
| 64-110 | 8 | 4 |

Table 7 shows CSI information, mode state, and PUCCH reporting modes according to PUCCH reporting type. A PUCCH reporting payload size is given according to PUCCH reporting type and mode state. The PUCCH reporting type is divided according to the contents of reported CSI. If the PUCCH reporting type is given and periodicity/offset of CQI/PMI/RI is given, the UE performing CSI reporting according to the PUCCH reporting type in a given subframe.

TABLE 7

| PUCCH Report Type | Reported | ModeState | Mode 1-1 (bits/BP) | Mode 2-1 (bits/BP) | Mode 1-0 (bits/BP) | Mode 2-0 (bits/BP) |
|---|---|---|---|---|---|---|
| 1 | Sub-band CQI | RI = 1 | NA | 4 + L | NA | 4 + L |
|   |   | RI > 1 | NA | 7 + L | NA | 4 + L |
| 2 | Wideband CQI/PMI | 2 TX Antennas RI = 1 | 6 | 6 | NA | NA |
|   |   | 4 TX Antennas RI = 1 | 8 | 8 | NA | NA |
|   |   | 2 TX Antennas RI > 1 | 8 | 8 | NA | NA |
|   |   | 4 TX Antennas RI > 1 | 11 | 11 | NA | NA |
| 3 | RI | 2-layer spatial multiplexing | 1 | 1 | 1 | 1 |
|   |   | 4-layer spatial multiplexing | 2 | 2 | 2 | 2 |
| 4 | Wideband CQI | RI = 1 or RI > 1 | NA | NA | 4 | 4 |

In Table 7, NA denotes not available and L denotes an integer equal to or greater than 0.
Referring to Table 7, four PUCCH reporting types are supported.
PUCCH reporting Type 1 supports CQI feedback for UE-selected subbands.
PUCCH reporting Type 2 supports wideband CQI and PMI feedback.
PUCCH reporting Type 3 supports RI feedback.
PUCCH reporting Type 4 supports wideband CQI.

Periodicity $N_P$ (in subframes) and offset $N_{OFFSET,CQI}$ (in subframes) for CQI/PMI reporting are given by a parameter cqi-pmi-ConfigIndex($I_{CQI/PMI}$). Tables 8 and 9 show the mapping relationship $I_{CQI/PMI}$ versus $N_P$ and $N_{OFFSET,CQI}$ for FDD and TDD, respectively. Periodicity $M_{RI}$ and relative offset $N_{OFFSET,RI}$ for RI are determined based on a parameter ri-ConfigIndex($I_{RI}$) given in Table 10. cqi-pmi-ConfigIndex and ri-ConfigIndex are configured by higher-layer (e.g. RRC) signaling. The relative reporting offset $N_{OFFSET,RI}$ for RI has one value among $\{0, -1, \ldots, -(N_P-1)\}$.

In the case where wideband CQI/PMI reporting is configured, reporting instances for wideband CQI/PMI are subframes satisfying $(10 \times n_f + \lfloor n_s/2 \rfloor - N_{OFFSET,CQI}) \bmod N_P = 0$ where $n_f$ denotes a frame number and $n_s$ denotes a slot number.

In the case where RI reporting is configured, the reporting interval of RI reporting is $M_{RI}$ multiple of period $N_P$ (in subframes). Reporting instances for RI are subframes satisfying $(10 \times n_f + \lfloor n_s/2 \rfloor - N_{OFFSET,CQI} - N_{OFFSET,RI}) \bmod (N_P \cdot M_{RI}) = 0$. If RI and wideband CQI/RI collide, wideband CQI/PMI is dropped.

In the case where both wideband CQI/PMI reporting and subband CQI reporting are configured, reporting instances for wideband CQI/PMI and subband CQI are subframe satisfying $(10 \times n_f + \lfloor n_s/2 \rfloor - N_{OFFSET,CQI}) \bmod N_P = 0$. The wideband CQI/PMI report has period $H \cdot N_P$ and is transmitted on subframes satisfying $(10 \times n_f + \lfloor n_s/2 \rfloor - N_{OFFSET,CQI}) \bmod (H \cdot N_P) = 0$. The integer H is defined as $H = J \cdot K + 1$ where J is the number of bandwidth parts. Between two wideband CQI/PMI reports, $J \cdot K$ reporting instances are used for subband CQI reporting.

In the case where RI reporting is configured, the reporting interval of RI is $M_{RI}$ times the wideband CQI/PMI period $H \cdot N_P$, and RI is reported on the same PUCCH cyclic shift resource as the wideband CQI/PMI and subband CQI reports. Reporting instances for RI are subframes satisfying $(10 \times n_f + \lfloor n_s/2 \rfloor - N_{OFFSET,CQI} - N_{OFFSET,RI}) \bmod (H \cdot N_P \cdot M_{RI}) = 0$. If RI and wideband CQI/PMI (or subband CQI) collide, wideband CQI/PMI (or subband CQI) is dropped.

The CQI/PMI or RI report is transmitted on a resource $n_{PUCCH}^{(2)}$ for PUCCH format 2. $n_{PUCCH}^{(2)}$ is UE specific and is configured by higher layers. If CQI/PMI/RI and a positive SR collide in the same subframe, CQI/PMI/RI is dropped.

TABLE 8

| $I_{CQI/PMI}$ | Value of $N_P$ | Value of $N_{OFFSET, CQI}$ |
|---|---|---|
| $0 \leq I_{CQI/PMI} \leq 1$ | 2 | $I_{CQI/PMI}$ |
| $2 \leq I_{CQI/PMI} \leq 6$ | 5 | $I_{CQI/PMI} - 2$ |
| $7 \leq I_{CQI/PMI} \leq 16$ | 10 | $I_{CQI/PMI} - 7$ |
| $17 \leq I_{CQI/PMI} \leq 36$ | 20 | $I_{CQI/PMI} - 17$ |
| $37 \leq I_{CQI/PMI} \leq 76$ | 40 | $I_{CQI/PMI} - 37$ |
| $77 \leq I_{CQI/PMI} \leq 156$ | 80 | $I_{CQI/PMI} - 77$ |
| $157 \leq I_{CQI/PMI} \leq 316$ | 160 | $I_{CQI/PMI} - 157$ |
| $I_{CQI/PMI} = 317$ |  | Reserved |
| $318 \leq I_{CQI/PMI} \leq 349$ | 32 | $I_{CQI/PMI} - 318$ |
| $350 \leq I_{CQI/PMI} \leq 413$ | 64 | $I_{CQI/PMI} - 350$ |
| $414 \leq I_{CQI/PMI} \leq 541$ | 128 | $I_{CQI/PMI} - 414$ |
| $542 \leq I_{CQI/PMI} \leq 1023$ |  | Reserved |

TABLE 9

| $I_{CQI/PMI}$ | Value of $N_P$ | Value of $N_{OFFSET, CQI}$ |
|---|---|---|
| $I_{CQI/PMI} = 0$ | 1 | $I_{CQI/PMI}$ |
| $1 \leq I_{CQI/PMI} \leq 5$ | 5 | $I_{CQI/PMI} - 1$ |
| $6 \leq I_{CQI/PMI} \leq 15$ | 10 | $I_{CQI/PMI} - 6$ |
| $16 \leq I_{CQI/PMI} \leq 35$ | 20 | $I_{CQI/PMI} - 16$ |
| $36 \leq I_{CQI/PMI} \leq 75$ | 40 | $I_{CQI/PMI} - 36$ |
| $76 \leq I_{CQI/PMI} \leq 155$ | 80 | $I_{CQI/PMI} - 76$ |

TABLE 9-continued

| $I_{CQI/PMI}$ | Value of $N_p$ | Value of $N_{OFFSET, CQI}$ |
|---|---|---|
| $156 \leq I_{CQI/PMI} \leq 315$ | 160 | $I_{CQI/PMI} - 156$ |
| $316 \leq I_{CQI/PMI} \leq 1023$ |  | Reserved |

TABLE 10

| $I_{RI}$ | Value of $M_{RI}$ | Value of $N_{OFFSET, RI}$ |
|---|---|---|
| $0 \leq I_{RI} \leq 160$ | 1 | $-I_{RI}$ |
| $161 \leq I_{RI} \leq 321$ | 2 | $-(I_{RI} - 161)$ |
| $322 \leq I_{RI} \leq 482$ | 4 | $-(I_{RI} - 322)$ |
| $483 \leq I_{RI} \leq 643$ | 8 | $-(I_{RI} - 483)$ |
| $644 \leq I_{RI} \leq 804$ | 16 | $-(I_{RI} - 644)$ |
| $805 \leq I_{RI} \leq 965$ | 32 | $-(I_{RI} - 805)$ |
| $966 \leq I_{RI} \leq 1023$ |  | Reserved |

For TDD periodic CQI/PMI reporting, the following periodicity values are applied according to TDD UL/DL configuration.

The reporting period $N_P=1$ is applicable only to TDD UL/DL configurations 0, 1, 3, 4, and 6. All UL subframes in a radio frame are used for CQI/PMI reporting.

The reporting period $N_P=5$ is applicable only to TDD UL/DL configurations 0, 1, 2, and 6.

The reporting period $N_P=\{10,20,40,80,160\}$ is applicable to all TDD UL/DL configurations.

Figure 10:
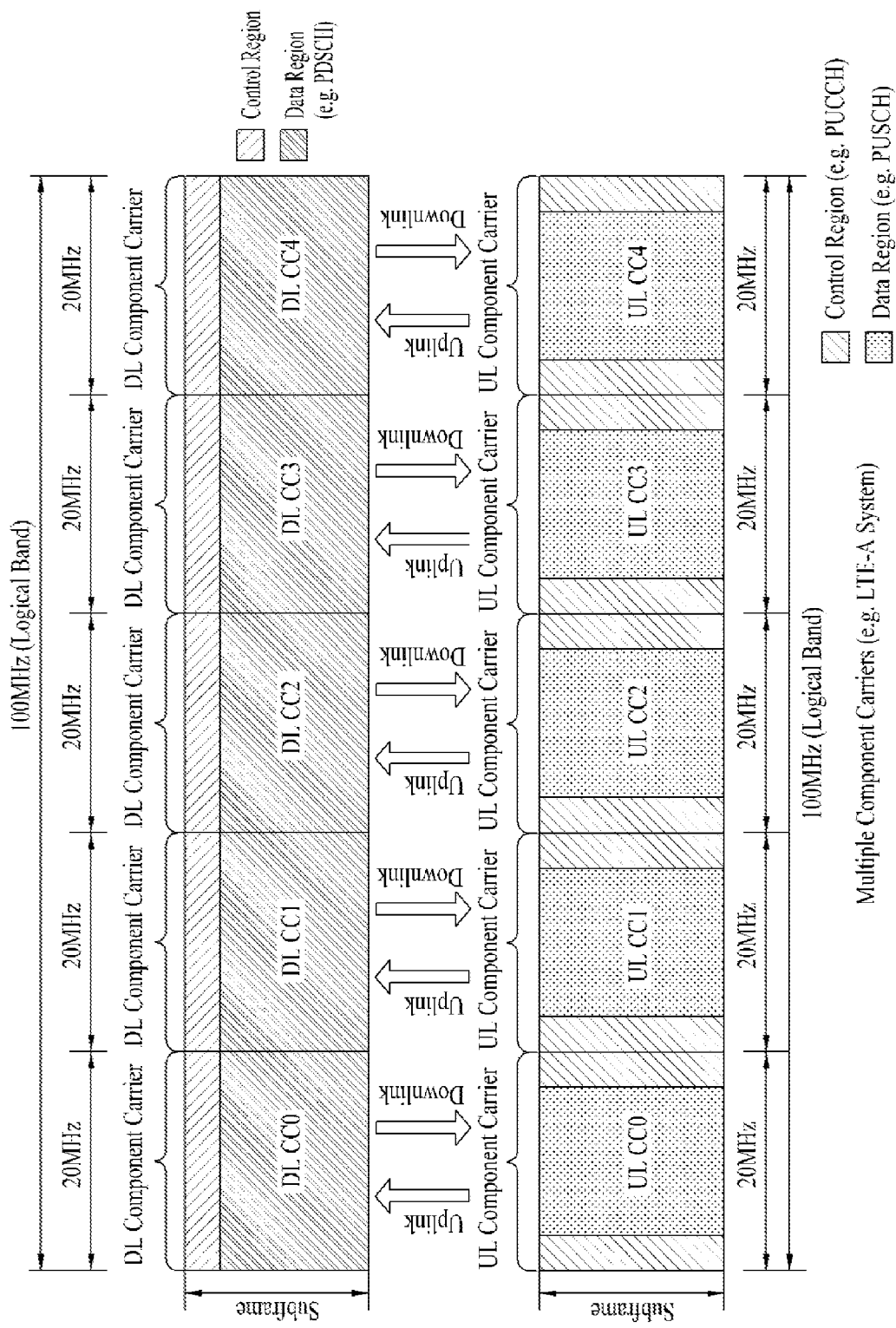
FIG. 10 illustrates a Carrier Aggregation (CA) communication system.

FIG. 10 illustrates a Carrier Aggregation (CA) communication system. An LTE-A system uses carrier aggregation or bandwidth aggregation that uses a wider UL/DL bandwidth by aggregating a plurality of UL/DL frequency blocks for a wider frequency band. Each frequency block is transmitted using a Component Carrier (CC). The CC may be understood as a carrier frequency (or center carrier, center frequency) for the corresponding frequency block.

Referring to FIG. 10, a wider UL/DL bandwidth can be supported by aggregating a plurality of UL/DL CCs. CCs may be contiguous or noncontiguous in the frequency domain. The bandwidths of the CCs may be independently determined. Asymmetric carrier aggregation in which the number of UL CCs differs from the number of DL CCs may be used. In the case of two DL CCs and one UL CC, for example, they may be configured such that the ratio of DL CCs to UL CCs is 2:1. The DL CC/UL CC link may be statically or semi-statically configured in a system. Furthermore, even if the entire system bandwidth is configured with N CCs, a frequency band that a specific UE can monitor/receive may be limited to M (<N) CCs. Various parameters regarding carrier aggregation may be configured cell-specifically, UE group-specifically, or UE-specifically. Meanwhile, control information may be configured so as to be transmitted and received only through a specific CC. This specific CC may be designated as a Primary CC (PCC) (or anchor CC) and the other CCs may be designated as Secondary CCs (SCCs).

LTE-A uses the concept of cells to manage radio resources. The cell is defined as a combination of DL and UL resources. Here, the UL resource is not an essential component. Accordingly, the cell can be configured with the DL resource alone, or with both the DL resource and UL resource. When carrier aggregation is supported, linkage between a DL resource carrier frequency (or DL CC) and a UL resource carrier frequency (or UL CC) may be indicated by system information. A cell that operates on the primary frequency (or PCC) may be designated as a primary cell (Pcell) and a cell that operates on the secondary frequency (or SCC) may be designated as a secondary cell (SCell). The PCell is used for the UE to perform an initial connection establishment or connection re-establishment procedure. PCell may represent a cell designated during a handover process. The SCell is configurable after RRC connection establishment and may be used to provide additional radio resources. The PCell and SCell may be commonly designated as a serving cell. Accordingly, for a UE that is in an RRC_SONNECTED state without carrier aggregation or does not support carrier aggregation, only one serving cell configured with only the PCellis presents. Meanwhile, for a UE in an RRC_CONNECTED state, for which carrier aggregation is configured, one or more serving cells including the PCell and SCellare present. For carrier aggregation, a network may configure one or more SCells for a UE that supports carrier aggregation in addition to the PCell initially configured in the connection establishment procedure after an initial security activation procedure is initiated.

If cross-carrier scheduling (or cross-CC scheduling) is applied, a PDCCH for DL allocation may be transmitted through DL CC#0 and a corresponding PDSCH may be transmitted through DL CC#2. For cross-CC scheduling, introduction of a Carrier Indicator Field (CIF) may be considered. Presence or absence of the CIF within the PDCCH may be configured semi-statically and UE-specifically (or UE group-specifically) through higher-layer signaling (e.g., RRC signaling). The baseline of PDCCH transmission is summarized as follows.

CIF disabled: PDCCH on a DL CC assigns PDSCH resources on the same DL CC or PUSCH resources on a single linked UL CC.

CIF enabled: PDCCH on a DL CC can assign PDSCH or PUSCH resources on a specific DL/UL CC of multiple aggregated DL/UL CCs using the CIF.

When a CIF is present, a BS may allocate a DL CC set for monitoring a PDCCH in order to lower blind decoding complexity of a UE. The PDCCH monitoring DL CC set may be a part of all aggregated DL CCs and include one or more DL CCs. The UE can detect/decode the PDCCH only in the corresponding DL CC set. That is, if the BS schedules the PDSCH/PUSCH to the UE, the BS can transmit the PDCCH only through the PDCCH monitoring DL CC. The PDCCH monitoring DL CC set may be configured UE-specifically, UE group-specifically, or cell-specifically. The term "PDCCH monitoring DL CC" may be replaced with equivalent terms such as monitoring carrier or monitoring cell. CC aggregated for the UE may be replaced with equivalent terms such as serving CC, serving carrier, or serving cell.

Figure 11:
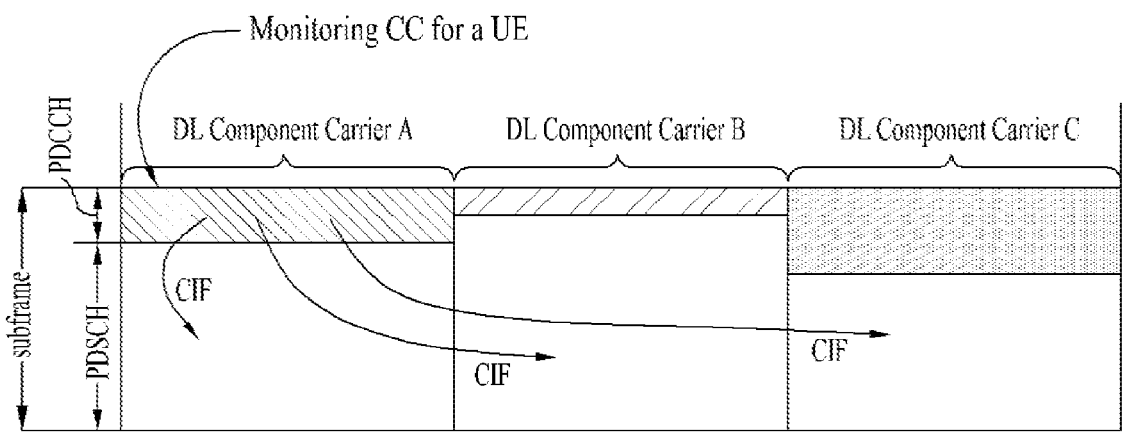
FIG. 11 illustrates cross-carrier scheduling.

FIG. 11 illustrates scheduling in the case where multiple carriers are aggregated. It is assumed that three DL CCs are aggregated and a DL CC A is configured as a PDCCH monitoring DL CC. DL CCs A, B, and C may be referred to as serving CCs, serving carriers, or serving cells. If a CIF is disabled, the DL CCs may transmit only PDCCHs for scheduling PDSCHs thereof without the CIF according to an LTE PDCCH rule. On the other hand, if the CIF is enabled by UE-specific (or UE group-specific or cell-specific) higher-layer signaling, the DL CC A (monitoring DL CC) may also transmit PDCCHs for scheduling PDSCHs of other CCs as well as a PDCCH for scheduling a PDSCH of the DL CC A, using the CIF. In this case, no PDCCH is transmitted in the DL CC B and DL CC C that are not configured as the PDCCH monitoring DL CC.

Figure 12:
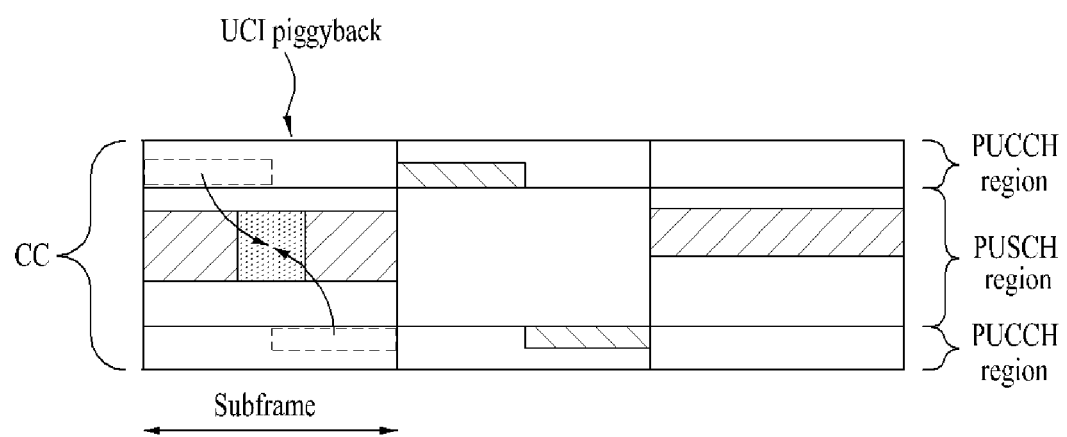
FIGS. 12 and 13 illustrate transmission of data/UCI.

FIG. 12 illustrates data/UCI transmission in legacy LTE.

Referring to FIG. 12, in legacy LTE, UL is supposed to preserve single-carrier transmission having a good Peak-to-Average Power Ratio (PAPR) or Cubic Metric (CM) characteristic for performance maintenance and efficient use of a UE power amplifier. For this purpose, in the case of PUSCH transmission, the single-carrier characteristic is maintained through DFT-precoding to be transmitted. In the case of PUCCH transmission, information is carried in a sequence having the single-carrier characteristic and then transmitted. However, if the DFT-precoded data is non-contiguously allocated in the frequency domain or a PUSCH and a PUCCH are simultaneously transmitted, the single-carrier characteristic is not maintained. Accordingly, if the PUCCH and PUSCH should be simultaneously transmitted in the same subframe as shown in FIG. 12, UCI to be transmitted through the PUCCH is supposed to be multiplexed and transmitted together with data through the PUSCH (piggybacked) in order to maintain the single-carrier characteristic.

Figure 13:
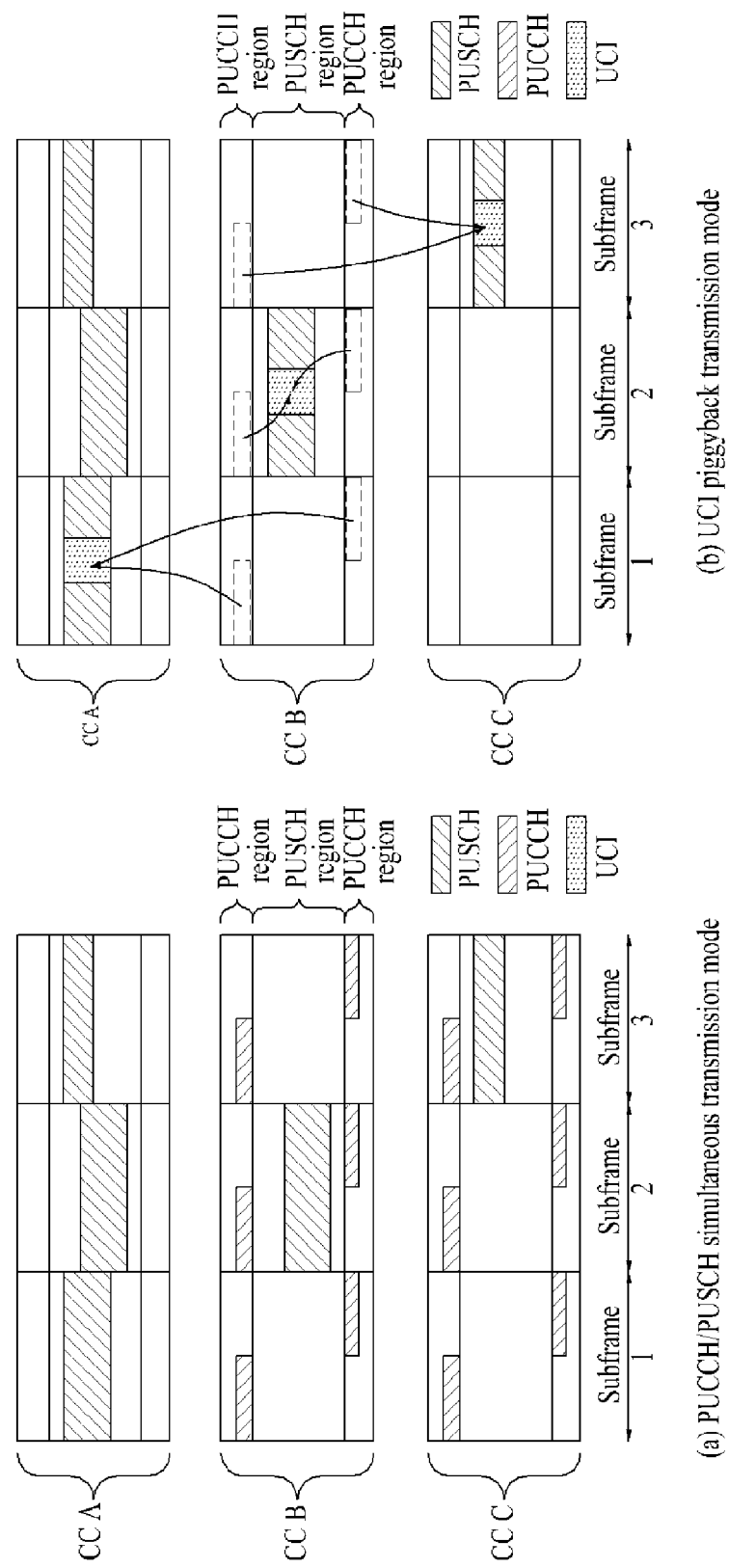

FIG. 13 illustrates data/UCI transmission in LTE-A.

Referring to FIG. 13, in an LTE-A system, it is possible for one UE to simultaneously transmit a plurality of PUSCHs through one subframe by aggregating a plurality of UL CCs. In the case of a PUCCH, it is considered to transmit the PUCCH only through one specific UL CC among the plurality of UL CCs. Accordingly, a situation in which simultaneous transmission of one or more PUSCHs and a PUCCH is needed in a specific subframe may occur and, in this case, the single-carrier characteristic required for UL transmission is not maintained. In the LTE-A system, such a problem can be solved because a better power amplifier is used. However, even an LTE-A UE may require transmission so as to have a low CM value by maintaining the single-carrier characteristic of a transmission signal due to an insufficient power problem according to situations (e.g. a UE located at a cell boundary). To this end, it may be considered to selectively configure two UL transmission modes in which (a) simultaneous transmission of all PUCCHs/PUSCHs is permitted, or (b) PUCCH UCI is piggybacked on a specific PUSCH for transmission, according to a UL situation of the UE as shown in FIG. 13. Especially, if a PUSCH transmitted on a specific UL CC in the PUCCH/PUSCH simultaneous transmission mode of (a) of FIG. 13 is present, partial or all UCI may be piggybacked on the PUSCH according to the type/amount of UCI which needs to be transmitted through the corresponding subframe and a PUCCH may be transmitted or may not be transmitted accordingly.

Embodiment

As described above, the legacy LTE system has two CSI transmission schemes: aperiodic CSI transmission and periodic CSI transmission. In the aperiodic CSI transmission scheme, CSI is triggered by a CSI request bit of a UL grant PDCCH and is aperiodically transmitted through a PUSCH. In the periodic CSI transmission scheme, CSI is configured by RRC signaling and is periodically transmitted through a PUCCH. Meanwhile, since the legacy LTE system has a structure in which one UE transmits and receives control signals/data through a single DL/UL CC, CSI DL CCs (i.e. measurement target DL CCs) in the aperiodic CSI scheme and the periodic CSI scheme are the same. In a general case, when a PUSCH is transmitted in a subframe in which periodic CSI is to be transmitted, the periodic CSI is multiplexed with UL data and is then transmitted through the PUSCH. However, when aperiodic CSI should be transmitted through the PUSCH in a subframe in which periodic CSI is to be transmitted, the periodic CSI is not piggybacked on the PUSCH and is dropped. This is because both periodic CSI and aperiodic CSI do not need to be transmitted since they are CSI for the same DL CC, and aperiodic CSI can provide more detailed CSI compared to periodic CSI.

Unlike this case, in the LTE-A system, one UE may transmit and receive control signals/data through a plurality of DL/UL CCs. In addition, one DL CC may perform scheduling for a single DL/UL CC (including the corresponding DL CC) or multiple DL/UL CCs (including the corresponding DL CC) according to whether a CIF is configured, i.e. whether a cross-CC is scheduled. To this end, the periodic CSI scheme may be applied to each of the multiple DL/UL CCs. In addition, an aperiodic CSI DL CC may be given as a DL CC on which a UL grant PDCCH is transmitted or a DL CC indicated by a CIF value in the corresponding PDCCH or may be determined according to a predetermined rule. For example, an aperiodic CQI is triggered with respect to a specific DL CC group or all DL CCs. Accordingly, the case may occur in which periodic CSI transmission for one or more DL CCs and an aperiodic CSI transmission for one or more DL CCs are simultaneously needed in the same subframe. In this case, a periodic CSI DL CC and an aperiodic CSI DL CC may be the same or different.

The present invention proposes a UE behavior when periodic CSI transmission for one or more DL CCs and aperiodic CSI transmission for one or more DL CCs are needed (i.e. collide) in the same subframe according to a UL transmission mode for a CC aggregation UE. The present invention assumes a situation in which a plurality of serving cells is configured. It is also assumed that periodic CSI feedback for each serving cell is independently configured per cell. A subframe for CSI reporting is given by periodicity and offset according to CSI configuration as described above. Specifically, for each serving cell, periodicity and offset for CQI/PMI may be given and periodicity and offset for RI may be independently given.

Characteristically, according to the present invention, when a UL transmission mode is set as a PUCCH/PUSCH simultaneous transmission mode, whether periodic CSI for a specific DL CC is to be transmitted through a PUCCH or is to be dropped is determined depending on whether an aperiodic CSI target DL CC and a periodic CSI target DL CC for which CSI report should be transmitted through a corresponding subframe are equal to or different from each other. Further, characteristically, when the UL transmission mode is set as a UCI piggyback transmission mode, whether periodic CSI for a specific DL CC is to be transmitted through piggyback on a PUSCH or is to be dropped is determined depending on whether an aperiodic CQI target DL CC and a periodic CQI target DL CC for which CSI report should be transmitted through a corresponding subframe are equal to or different from each other. A detailed UE behavior may be defined as follows.

PUCCH/PUSCH Simultaneous Transmission Mode

Method 1: Conditional Transmission/Dropping of Periodic CSI a) When a periodic CSI DL CC which is identical to an aperiodic CSI DL CC is present, corresponding periodic CSI may be dropped.

b) When one periodic CSI DL CC which is different from an aperiodic CSI DL CC is present, corresponding periodic CSI is transmitted through a PUCCH. Meanwhile, if ACK/NACK transmission is needed in a corresponding subframe, the periodic CSI may be piggybacked on a PUSCH. In this case, ACK/NACK may be transmitted through the PUCCH.

c) A plurality of periodic CSI DL CCs which is different from an aperiodic CSI DL CC is present, the following two methods may be considered.

Alt 1-1: One of pieces of periodic CSI is selected and may be transmitted through the PUCCH. Meanwhile, if ACK/NACK transmission is needed in a corresponding subframe, the corresponding periodic CSI may be piggybacked on the PUSCH. In this case, ACK/NACK may be transmitted through the PUCCH. The following criteria may be used to give priority for the selection of periodic CSI to be transmitted.

A high priority is assigned to periodic CSI having the longest CSI transmission period.

A high priority is assigned to periodic CSI having the widest CSI measurement bandwidth.

Priority of periodic CSI may be determined according to the contents of CSI. For example, priority may be as follows: RI>wideband CQI, wideband CQI>subband CQI, RI>long-term PMI, long-term PMI>short-term PMI, PMI>CQI, RI>CQI, and RI>PMI=CQI. When combining the above priority, priority may be determined in order of CSI reporting (RI series)>CSI reporting (WB CQI series)>CSI reporting (SB CQI series). As another method, a CSI priority may be defined by PUCCH reporting type. Table 11 shows CSI, mode state, and PUCCH reporting mode according to PUCCH reporting type.

TABLE 11

| PUCCH Reporting Type | Reported | ModeState | PUCCH Reporting Modes | | | |
|---|---|---|---|---|---|---|
| | | | Mode 1-1 (bits/BP) | Mode 2-1 (bits/BP) | Mode 1-0 (bits/BP) | Mode 2-0 (bits/BP) |
| 1 | Sub-band CQI | RI = 1 | NA | 4 + L | NA | 4 + L |
| | | RI > 1 | NA | 7 + L | NA | 4 + L |
| 1a | Sub-band CQI/ second PMI | 8 antenna ports RI = 1 | NA | 8 + L | NA | NA |
| | | 8 antenna ports 1 < RI < 5 | NA | 9 + L | NA | NA |
| | | 8 antenna ports RI > 4 | NA | 7 + L | NA | NA |
| 2 | Wideband CQI/PMI | 2 antenna ports RI = 1 | 6 | 6 | NA | NA |
| | | 4 antenna ports RI = 1 | 8 | 8 | NA | NA |
| | | 2 antenna ports RI > 1 | 8 | 8 | NA | NA |
| | | 4 antenna ports RI > 1 | 11 | 11 | NA | NA |
| 2a | Wideband first PMI | 8 antenna ports RI < 3 | NA | 4 | NA | NA |
| | | 8 antenna ports 2 < RI < 8 | NA | 2 | NA | NA |
| | | 8 antenna ports RI = 8 | NA | 0 | NA | NA |
| 2b | Wideband CQI/ second PMI | 8 antenna ports RI = 1 | 8 | 8 | NA | NA |
| | | 8 antenna ports 1 < RI < 4 | 11 | 11 | NA | NA |
| | | 8 antenna ports RI = 4 | 10 | 10 | NA | NA |
| | | 8 antenna ports RI > 4 | 7 | 7 | NA | NA |
| 2c | Wideband CQI/ first PMI/ second PMI | 8 antenna ports RI = 1 | 8 | — | NA | NA |
| | | 8 antenna ports 1 < RI ≤ 4 | 11 | — | NA | NA |
| | | 8 antenna ports 4 < RI ≤ 7 | 9 | — | NA | NA |
| | | 8 antenna ports RI = 8 | 7 | — | NA | NA |
| 3 | RI | 2-layer spatial multiplexing | 1 | 1 | 1 | 1 |
| | | 4-layer spatial multiplexing | 2 | 2 | 2 | 2 |
| | | 8-layer spatial multiplexing | 3 | 3 | NA | NA |
| 4 | Wideband CQI | RI = 1 or RI > 1 | NA | NA | 4 | 4 |
| 5 | RI/first PMI | 8 antenna ports, 2-layer spatial multiplexing | 4 | NA | NA | NA |
| | | 8 antenna ports, 4 and 8-layer spatial multiplexing | 5 | | | |
| 6 | RI/PTI | 8 antenna ports, 2-layer spatial multiplexing | NA | 2 | NA | NA |
| | | 8 antenna ports, 4-layer spatial multiplexing | NA | 3 | NA | NA |
| | | 8 antenna ports, 8-layer spatial multiplexing | NA | 4 | NA | NA |

* NA denotes not available and L denotes an integer equal to or greater than 0.

In Table 11, a CSI reporting priority may be given in order of PUCCH reporting types 2a, 3, 5, and 6 (RI series)>PUCCH reporting types 2, 2b, 2c, and 4 (WB CQI series)> PUCCH reporting types 1 and 1a (SB series). According to this method, if CSI reports of multiple CCs (or cells) collide, a CSI report having a PUCCH reporting type of a low priority is dropped.

According to this method, CSI reports of multiple CCs (or cells) may have the same priority. For example, CSI reports between a plurality of CCs (or cells) having PUCCH reporting types of the same priority may collide. In this case, an additional condition for selecting one specific CSI report is needed. Other CSI reports (i.e. CSI reports of other CCs (or cells)) except for the one specific CSI report (i.e. CSI report of a specific CC (or cell)) are dropped.

Periodic CSI having the highest CC (or cell) priority, for example, periodic CSI for a primary DL CC (i.e. a DL CC linked with a UL CC transmitting the PUCCH) may be set to have the highest priority. The CC (or cell) priority may be determined based on an index. For example, if CSI reports of a plurality of CCs (or cells) collide, a CSI report of a CC (or cell) having the smallest index may have the highest priority. In this case, CSI reports of CCs (or cells) having a low priority may be dropped.

Priority of periodic CSI reports may be determined by a combination of the above-described conditions. For example, if periodic CSI reports of multiple CCs (or cells) collide in one subframe, a periodic CSI report of a CC (or cell) having a low priority may be dropped. If multiple CCs (or cells) having PUCCH reporting types of the same priority are present, a periodic CSI report of a CC (or cell) having the smallest CC (or cell) index is piggybacked on the PUSCH and periodic CSI reports of the other all CCs (or cells) may be dropped.

Alt 1-2: Some or all of periodic CSI among periodic CSI may be selected and transmitted through the PUCCH. If ACK/NACK transmission is needed in a corresponding subframe, periodic CSI may be piggybacked on the PUSCH. In this case, ACK/NACK may be transmitted through the PUCCH. Priority for the selection of periodic CSI to be transmitted may be assigned using the criteria of Alt1-1.

UCI Piggyback Transmission Mode (i.e. PUCCH/PUSCH Simultaneous Transmission Mode is not Configured)

Method 2-1: Conditional Piggyback/Dropping of Periodic CSI a) When a periodic CSI DL CC which is identical to an aperiodic CSI DL CC is present, corresponding periodic CSI may be dropped.

b) When one periodic CSI DL CC which is different from an aperiodic CSI DL CC is present, corresponding periodic CSI may be piggybacked on a PUSCH.

c) A plurality of periodic CSI DL CCs which is different from an aperiodic CSI DL CC is present, the following two methods may be considered.

Alt 2-1: One of periodic CSI may be selected and piggybacked. The following criteria may be applied to give priority for the selection of periodic CSI to be piggybacked.

Periodic CSI having the longest CSI transmission period has the highest priority.

Periodic CSI having the widest CSI measurement bandwidth has a high priority.

Priority of periodic CSI may be determined according to contents of CSI. For example, priority may be given as follows: RI>wideband CQI, wideband CQI>subbandCQI, RI>long-term PMI, long-term PMI>short-term PMI, PMI>CQI, and RI>CQI, and RI>PMI=CQI. When combining the above priority, priority may be determined in order of CSI reporting (RI series)>CSI reporting (WB CQI series)>CSI reporting (SB CQI series). As another method, a CSI priority may be determined by a PUCCH reporting type. For this, reference may be made to the above-described Alt 1-1 and Table 11.

Periodic CSI having the highest CC (or cell) priority, for example, periodic CSI for a primary DL CC (i.e, a DL CC linked with a UL CC transmitting the PUCCH) may be set to have the highest priority. The CC (or cell) priority may be determined based on an index. For example, if CSI reports of a plurality of CCs (or cells) collide, a CSI report of a CC (or cell) having the smallest index may have the highest priority. In this case, CSI reports of CCs (or cells) having a low priority may be dropped.

Priority of periodic CSI reports may be determined by a combination of the above-described conditions. For example, if periodic CSI reports of multiple CCs (or cells) collide in one subframe, a periodic CSI report of a CC (or cell) having a low priority may be dropped. If multiple CCs (or cells) having a PUCCH reporting type of the same priority are present, a periodic CSI report of a CC (or cell) having the smallest CC (or cell) index is piggybacked on the PUSCH and periodic CSI reports of the other all CCs (or cells) may be dropped.

Alt 2-2: Some or all of periodic CSI(s) among periodic CSIs may be selected and piggybacked. Priority for the selection of periodic CSI to be piggybacked may be assigned using the criteria of Alt 2-1

Method 2-2: Unconditional Dropping of Periodic CSI a) All periodic CSI is dropped irrespective of a DL CC in a subframe in which aperiodic CSI transmission for one or more DL CCs is needed.

By selectively applying the above Method 1, 2-1, or 2-2 according to the UL transmission mode, unnecessary transmission of overlapped CSI can be prevented and simultaneously efficient CSI transmission can be performed through determination of non-overlapped CSI.

Figure 14:
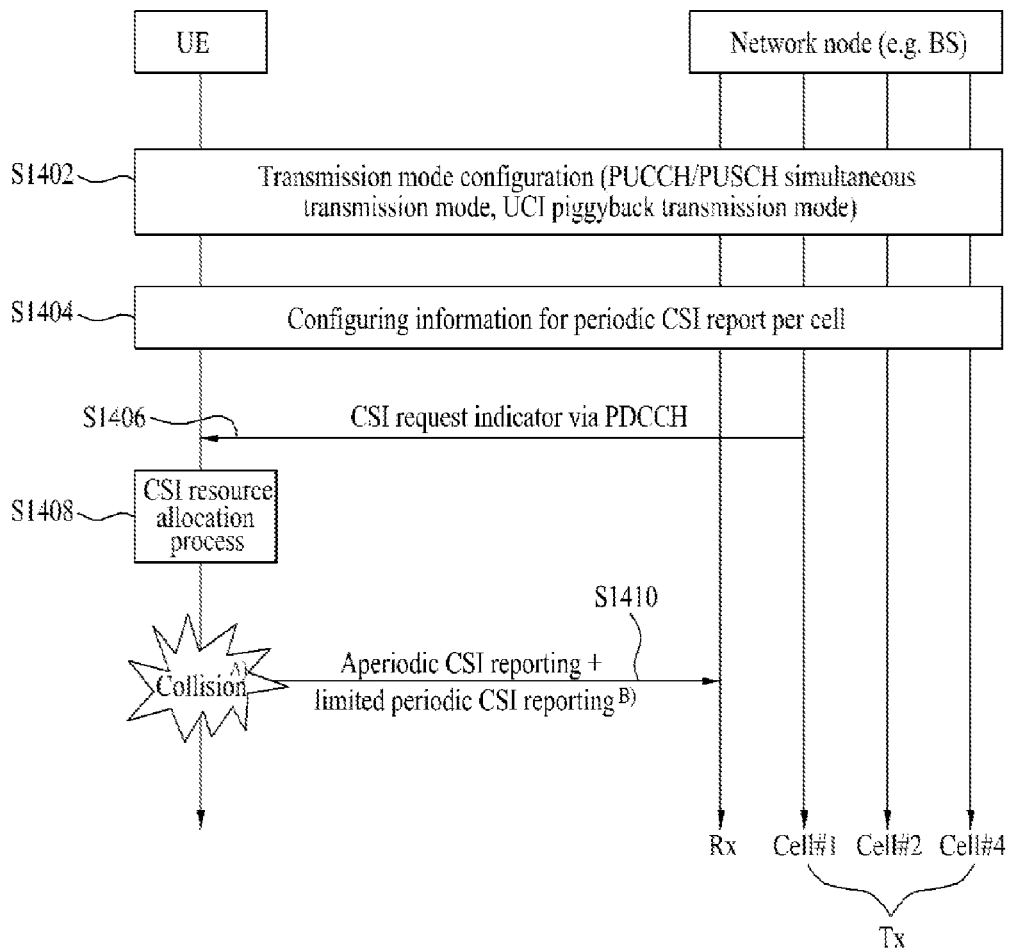
FIG. 14 illustrates a method for performing CSI reporting according to an exemplary embodiment of the present invention.

FIG. 14 illustrates a method for performing CSI reporting according to an exemplary embodiment of the present invention. In this example, it is assumed that three DL cells are configured. The three cells may indicate all cells configured for a corresponding UE or only activated cells among configured cells. The configured cells include a DL PCell and one or more DL SCells, which are referred to as a serving cell.

Referring to FIG. 14, a UE and a network node (e.g. BS or relay) configure a transmission mode (S1402). The transmission mode includes a PUCCH/PUSCH simultaneous transmission mode or a UCI piggyback transmission mode. The transmission mode is configured through higher-layer signaling (RRC signaling or Medium Access Control (MAC) signaling), or physical-layer signaling (e.g. PDCCH). The transmission mode may be signaled through cell-specifically, UE group-specifically, or UE-specifically. The UE and the network node configure information for a periodic CSI report per serving cell (step S1404). To this end, the network node transmits configuration information for CSI reporting to the UE. The configuration information for CSI reporting includes a PUCCH reporting type, period, offset, bandwidth size, etc. After the configuration information for periodic CSI reporting is configured, the UE performs a PUCCH resource allocation process for CSI reporting according to a PUCCH reporting type/mode (S1408). Specifically, the UE determines whether to perform a CSI report in a corresponding subframe according to a CSI reporting period and offset configured per serving cell and determines whether to allocate a PUCCH resource. The PUCCH resource includes PUCCH format 2/2a/2b.

Meanwhile, the UE receives a request for an aperiodic CSI report from the network node (S1406). The aperiodic CSI report may be received through a PDCCH for a UL grant. Upon receiving a request for the aperiodic CSI report, the UE performs the CSI resource allocation process (S1408). A resource for the aperiodic CSI report includes a PUSCH resource. The aperiodic CSI report is mapped to a PUSCH according to the methods illustrated in FIGS. 8 and 9.

In this case, an aperiodic CSI report and one or more periodic CSI reports may need to be transmitted in the same subframe. That is, a plurality of CSI reports for a plurality of cells may collide in the same subframe. Then, the UE normally performs aperiodic CSI reporting and limitedly performs periodic CSI reporting (S1410). Specifically, the periodic CSI reporting may be limitedly performed in consideration of the transmission mode configured in step S1402. Limited CSI reporting mentioned in step S1420 includes i) dropping one or more periodic CSI reports, ii) piggybacking one or more periodic CSI reports on a channel for an aperiodic CSI report, and iii) a combination thereof. Dropping the periodic CSI reports includes unconditionally dropping periodic CSI reports for all serving cells. Specifically, the periodic CSI reports may be dropped according to the above-described method 1, 2-1, or 2-2 or may be piggybacked on the periodic CSI reports. As described above, in a situation in which a plurality of cells is configured, when a periodic CSI report collides with an aperiodic CSI report, unnecessary transmission of overlapped CSI is prevented and simultaneously efficient CSI transmission can be performed through determination of non-overlapped CSI, by controlling/limiting a periodic CSI report of a specific cell.

Figure 15:
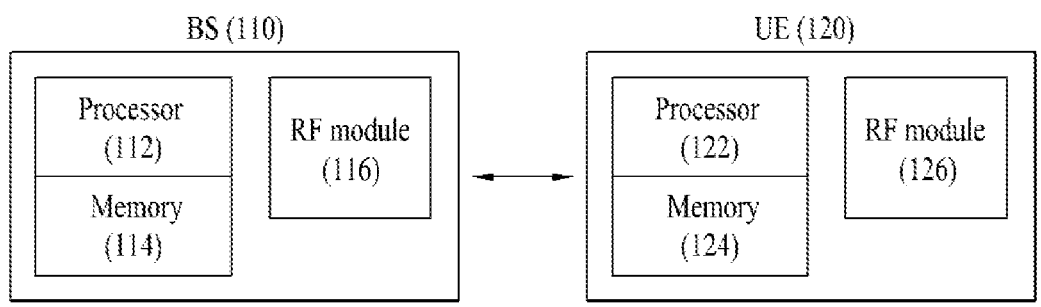
FIG. 15 illustrates a BS and a UE which are applicable to an exemplary embodiment of the present invention.

FIG. 15 illustrates a BS and a UE which are applicable to an exemplary embodiment of the present invention. If a radio communication system includes a relay, communication over a backhaul link is performed between the BS and the relay and communication over an access link is performed between the relay and the UE. Accordingly, the BS and UE shown in FIG. 15 may be replaced with the relay according to circumstance.

Referring to FIG. 15, a radio communication system includes a BS 110 and a UE 120. The BS 110 includes a processor 112, a memory 114, and a Radio Frequency (RF) unit 116. The processor 112 may be configured to implement the procedures and/or methods proposed in the present invention. The memory 114 is connected to the processor 112 and stores information related to operation of the processor 112. The RF unit 116 is connected to the processor 112 and transmits and/or receives radio signals. The UE 120 includes a processor 122, a memory 124, and an RF unit 126. The processor 122 may be configured to implement the procedures and/or methods proposed in the present invention. The memory 124 is connected to the processor 122 and stores information related to operation of the processor 122. The RF unit 126 is connected to the processor 122 and transmits and/or receives radio signals. The BS 110 and/or the UE 120 may have a single antenna or multiple antennas.

The above-described embodiments are combinations of constituent elements and features of the present invention in a predetermined form. The constituent elements or features should be considered selectively unless otherwise mentioned. Each constituent element or feature may be practiced without being combined with other constituent elements or features. Further, the embodiments of the present invention may be constructed by combining partial constituent elements and/or partial features. Operation orders described in the embodiments of the present invention may be rearranged. Some constructions or features of any one embodiment may be included in another embodiment or may be replaced with corresponding constructions or features of another embodiment. It is apparent that the embodiments may be constructed by a combination of claims which do not have an explicitly cited relationship in the appended claims or may include new claims by amendment after application.

In the present document, a description has been made of a data transmission and reception relationship between a UE and a BS. Here, a specific operation described as being performed by the BS may be performed by an upper node of the BS. Namely, it is apparent that, in a network comprised of a plurality of network nodes including the BS, various operations performed for communication with the UE may be performed by the BS, or network nodes other than the BS. The term BS may be replaced with the term fixed station, Node B, eNode B (eNB), access point, etc. The term UE may be replaced with the term Mobile Station (MS), Mobile Subscriber Station (MSS), etc.

The embodiments of the present invention may be achieved by various means, for example, hardware, firmware, software, or a combination thereof. In a hardware configuration, the exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the exemplary embodiments of the present invention may be achieved by a module, a procedure, a function, etc. performing the above-described functions or operations. Software code may be stored in a memory unit and executed by a processor. The memory unit may be located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention may be used for a wireless communication device such as a UE, a relay, and a BS.

The invention claimed is:
1. A method for performing channel state information (CSI) reporting in a wireless communication system, the method comprising:
 receiving CSI configuration information for a plurality of cells, wherein the CSI configuration information is used to perform a periodic CSI report for each cell;
 receiving information requesting an aperiodic CSI report for a first cell; and
 transmitting a periodic CSI report for a second cell different from the first cell with the aperiodic CSI report for the first cell in a corresponding subframe,
 wherein, if a physical uplink control channel (PUCCH) and a physical uplink shared channel (PUSCH) are transmitted in the corresponding subframe simultaneously, the periodic CSI report for the second cell is transmitted via the PUCCH and the aperiodic CSI report for the first cell is transmitted via the PUSCH in the corresponding subframe, and wherein, if the PUCCH and the PUSCH are not transmitted in the corresponding subframe simultaneously, the periodic CSI report for the second cell is piggybacked on the PUSCH and the periodic CSI report for the second cell and the aperiodic CSI report for the first cell are transmitted via the PUSCH in the corresponding subframe.

2. The method of claim 1, wherein the periodic CSI report for the second cell having the highest priority among a plurality of periodic CSI is selected using a content priority, a cell priority, or a combination thereof.

3. A communication device configured to perform channel state information (CSI) reporting in a wireless communication system, the communication device comprising:

a radio frequency (RF) unit; and a processor, wherein the processor is configured to receive CSI configuration information for a plurality of cells, to receive information requesting an aperiodic CSI report for a first cell, and to transmit a periodic CSI report for a second cell different from the first cell with the aperiodic CSI report for the first cell in a corresponding subframe, wherein, if a physical uplink control channel (PUCCH) and a physical uplink shared channel (PUSCH) are transmitted in the corresponding subframe simultaneously, the periodic CSI report for the second cell is transmitted via the PUCCH and the aperiodic CSI report for the first cell is transmitted via the PUSCH in the corresponding subframe, and wherein, if the PUCCH and the PUSCH are not transmitted in the corresponding subframe simultaneously, the periodic CSI report for the second cell is piggybacked on the PUSCH and the periodic CSI report for the second cell and the aperiodic CSI report for the first cell are transmitted via the PUSCH in the corresponding subframe.

4. The communication device of claim 3, wherein the periodic CSI report for the second cell having the highest priority among a plurality of periodic CSI reports is selected using a content priority, a cell priority, or a combination thereof.

* * * * *